United States Patent
Doken

(10) Patent No.: US 12,052,474 B2
(45) Date of Patent: Jul. 30, 2024

(54) SYSTEMS AND METHODS FOR GENERATING INTERACTABLE ELEMENTS IN TEXT STRINGS RELATING TO MEDIA ASSETS

(71) Applicant: Rovi Guides, Inc., San Jose, CA (US)

(72) Inventor: Serhad Doken, Bryn Mawr, PA (US)

(73) Assignee: Rovi Guides, Inc., San Jose, CA (US)

( * ) Notice: Subject to any disclaimer, the term of this patent is extended or adjusted under 35 U.S.C. 154(b) by 12 days.

(21) Appl. No.: 17/552,979

(22) Filed: Dec. 16, 2021

(65) Prior Publication Data

US 2023/0199260 A1    Jun. 22, 2023

(51) Int. Cl.
*H04N 21/4788* (2011.01)
*G06F 3/04812* (2022.01)
*G06F 16/955* (2019.01)
*G06F 40/279* (2020.01)

(52) U.S. Cl.
CPC ..... *H04N 21/4788* (2013.01); *G06F 3/04812* (2013.01); *G06F 16/9558* (2019.01); *G06F 40/279* (2020.01)

(58) Field of Classification Search
CPC ............ H04N 21/4788; G06F 3/04812; G06F 16/9558; G06F 40/279
See application file for complete search history.

(56) References Cited

U.S. PATENT DOCUMENTS

| | | | |
|---|---|---|---|
| 7,761,892 B2 | 7/2010 | Ellis et al. | |
| 2012/0221587 A1 | 8/2012 | Chen | |
| 2018/0285742 A1 | 10/2018 | Makino | |
| 2018/0288490 A1* | 10/2018 | Thomas | H04N 21/858 |
| 2019/0146975 A1* | 5/2019 | Sadauskas | G06F 16/31 |
| | | | 707/722 |
| 2019/0392040 A1* | 12/2019 | Puniyani | H04N 21/482 |

OTHER PUBLICATIONS

U.S. Appl. No. 17/552,972, filed Dec. 16, 2021, Serhad Doken.
U.S. Appl. No. 17/552,976, filed Dec. 16, 2021, Serhad Doken.

* cited by examiner

*Primary Examiner* — Nathan J Flynn
*Assistant Examiner* — Christine A Kurien
(74) *Attorney, Agent, or Firm* — Haley Guiliano LLP

(57) ABSTRACT

Systems and methods for improving displays of media assets are disclosed herein. In an embodiment, a system receives a plurality of text comments from a plurality of devices to which a media asset was transmitted. The system analyzes the comments to identify text strings within the text comments. The system generates interactable elements from the text strings in the text comments, such that an interaction with the text string causes display of identifiers of media assets corresponding to the text string.

20 Claims, 14 Drawing Sheets

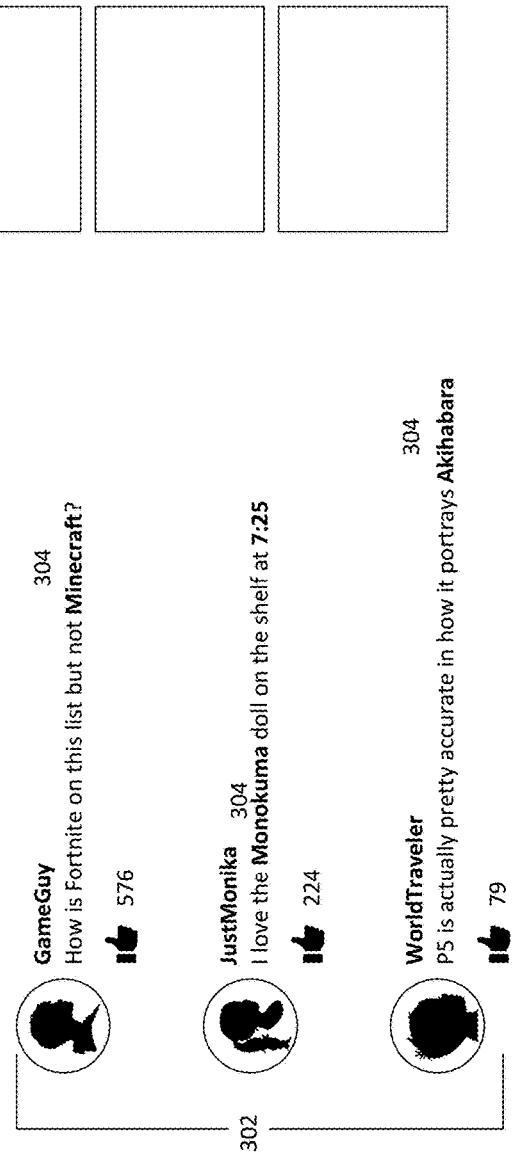
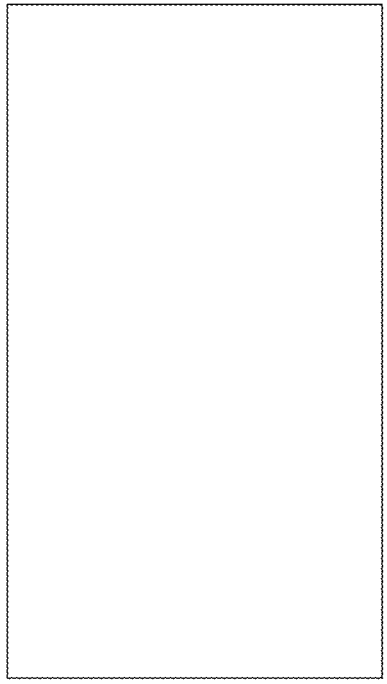
Top Ten Video Games of All Time
Here are my top ten video games of all time. Timestamps below. Special thanks to CircleEarth for sponsoring this video!
0:00 Introduction
2:02 Legend of Zelda: Ocarina of Time
3:42 Fortnite
• • •
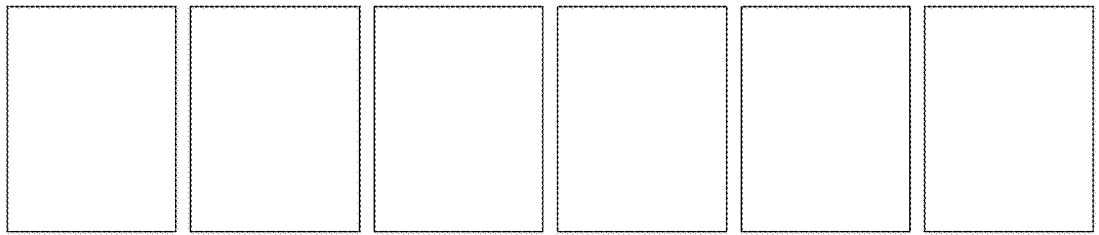
FIG. 3

Top Ten Video Games of All Time

Here are my top ten video games of all time. Timestamps below.
Special thanks to CircleEarth for sponsoring this video!

0:00 Introduction
2:02 Legend of Zelda: Ocarina of Time
3:42 Fortnite
• • •

Purchase a Monokuma Doll 908
*RetailShopper*

GameGuy 904
How is Fortnite on this list but not Minecraft?
👍 576

JustMonika 904
I love the Monokuma doll on the shelf at 7:25
👍 224

WorldTraveler 904
P5 is actually pretty accurate in how it portrays Akihabara
👍 79

SYSTEMS AND METHODS FOR GENERATING INTERACTABLE ELEMENTS IN TEXT STRINGS RELATING TO MEDIA ASSETS

BACKGROUND

This disclosure is generally directed to graphical user interfaces for displaying media assets. In particular, methods and systems are provided for modifying text strings in text comments displayed on graphical user interfaces to include interactable elements.

SUMMARY

Modernly, media assets, such as videos, music, podcasts, or images are provided to users through a graphical user interface. The graphical user interface may additionally include recommendations of other videos or other supplemental content. Unfortunately, identifying recommendations can be extremely difficult and the display of bad recommendations can clutter the interface or require additional searches which increases the computational load on the media server. In some approaches, recommendations are provided for any other available media. These approaches have the same effect as generating and displaying no recommendations, as both require additional searching without displaying the best recommendations in an easily identifiable location.

To address the aforementioned problem, in one approach, recommendations are provided based on metadata of the media asset, metadata of the viewing device, and/or popularity of other media assets. For instance, a displayed media asset may have metadata including a title and one or more "tags" which comprise keywords identifying terms relating to the media asset. Recommendations may be generated through a search of other media assets for media assets that match the tags of the video or the title of the video. Alternatively, recommendations may be generated based on user preferences which identify types of media assets or sources of media assets that are enjoyed by a user.

While the above approach does provide many options for generating recommendations, the recommendations do not take into account a way a user is interacting with a media asset. For instance, many graphical user interfaces through which media assets are displayed provide options through which viewing devices can provide comments on the media assets. The comments can include text comments, video comments, image comments, audio comments, or any other media provided by the user in relation to the video. Device interactions with the media asset through comments may indicate different video preferences. For instance, a video about cooking may include a comment relating to a special knife that was used. If the knife is unidentified in the tags or title of the video, the special knife will not be used to generate recommendations or supplemental content.

To overcomes such deficiencies, methods and systems are described herein for leveraging information in comments received from a plurality of devices to which a media asset was displayed to modify the media asset, media asset recommendations, or the comment interface. The present disclosure addresses the problem of generating recommendations with incomplete information by analyzing comment data to generate new information through which recommendations can be generated. The present disclosure additionally provides additional methods for generating search interfaces, thereby providing a less cluttered interface that is visually navigable.

In some embodiments, text of comments on a media asset are analyzed for terms that do not match recommended media assets. The terms that do not match recommended assets are then analyzed to determine whether search results should be generated based on the terms. The analysis may take into account metadata of a device that posted the comment, a length of the term, a frequency of the term in the comments, previous searches for the term, or whether the term matches a location, product, person, or other known entity.

In some embodiments, the comments are modified to include interactable elements, such as a hyperlink. For instance, if the media server determines that the term "Japanese gardens" should be used to generate search results, the media server may modify the term "Japanese gardens" to include an interactable element such that search results for the term "Japanese gardens" are displayed in response to a selection of the interactable element.

In some embodiments, the interactable elements, when selected cause displaying search results based on the comment text in addition to previous recommendations and the media asset, such as through an overlay of the graphical user interface. The additional display of the search results based on the comment provides an additional tool for searching for content through terms in text comments.

In some embodiments, the search results include connections to other platforms through an application programming interface or hyperlinks. The media server may utilize a datastore corresponding to the other platforms to determine matches between the term and the other platform, and provide a link to the other platform. Examples include retail purchasing platforms, travel platforms, map platforms, or other media platforms.

In some embodiments, the comments are analyzed to determine if text in the comments relates to supplemental content. If text of the comments relates to supplemental content, the media server may modify the media asset to display the supplemental content. In some embodiments, the media asset and the comment are analyzed to identify a location and/or time in the media asset to display the supplemental content.

DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 3 depicts an example embodiment of a user interface where text in comments is replaced with an interactable element.

FIG. 4 depicts an example embodiment of a user interface where input interacting with a multimedia link causes simultaneous display of a media asset, identifiers of recommended media assets, and identifiers of media assets identified based on the text of the multimedia link.

FIG. 9 depicts an example embodiment of modifying display of a media asset with supplemental content based on data from a text comment.

DETAILED DESCRIPTION

Figure 1:
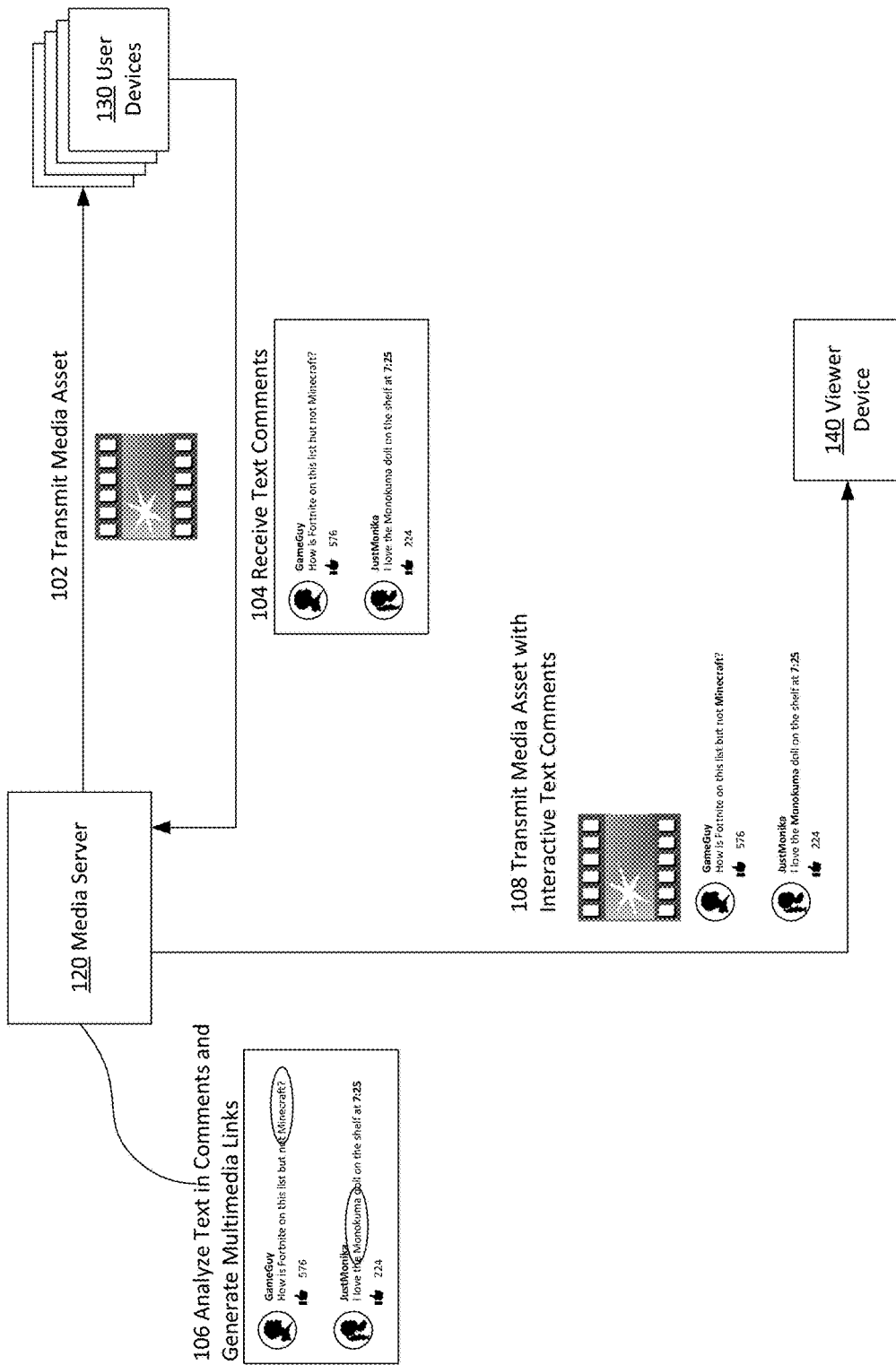
FIG. 1 depicts an example system for generating interactable text strings in comments based on text analysis.

FIG. 1 depicts an example system for generating interactable text strings in comments based on text analysis. FIG. 1 includes a media server 120, user devices 130, and a viewer device 140. FIG. 1 provides a practical example of a system; one skilled in the art would recognize that more or less suitable elements may be used to perform the methods described herein. For example, a first server may transmit the media assets while a second server performs the comment analysis. As another example, the media server 120 may communicate with an external server, such as through an application programming interface (API), to identify options for displaying in response to a selection of an interactive element.

In the example embodiment of FIG. 1, at step 102, a media server 120 provides a media asset to user devices 130. The media server 120 may provide the media asset through an application hosted by the media server 120 and/or through a separate application, such as a webpage accessed through a browser. The media asset may comprise video, audio, images, and/or any combination thereof. For instance, the media asset may be any of a stored video, a streamed video, an image, such as an image of a product for purchase or an image of a location for travel, an audio recording, such as a podcast or song, or any other type of media asset, such as a graphics interchange format (GIF) image.

In the example embodiment of FIG. 1, at step 104, the user devices 130 transmit text comments for the media asset to the media server 120. For example, the media server 120 may provide a graphical user interface through which text comments may be generated with respect to the provided media asset. The graphical user interface may additionally provide other comment options, such as image, video, or audio. In some embodiments, media server 120 additionally provides suggestions for text in the comments based on metadata of the media asset and/or based on text strings in previously submitted comments identified through the methods described herein. Through the graphical user interface, different user devices 130 may input different text comments. When a "submit" option is selected after text has been entered into the graphical user interface, a text comment is transmitted to the media server 120. The text comment may additionally be stored with metadata identifying a profile corresponding to the comment submission, such as user profile information and/or metadata relating to the video. The user profile information may include demographic information, previous search histories, previous application usage, previous comments, or other information relating to a user profile through which the comment was generated.

In the example embodiment of FIG. 1, at step 106, the media server 120 analyzes the text in the text comments and generates multimedia links from the analyzed text. For example, the media server 120 may analyze the text comments using the methods described herein to identify a text string in at least one of the text comments. The media server 120 uses the text string to generate one or more results, such as through a search of media assets of the media server 120 or a search for externally provided media assets through other applications and/or server computers. The media server 120 modifies the text comment to generate a multimedia link from the text string. The multimedia link may take the appearance of the text string in the comment, such that the text string in the comment may be selectable.

In the example embodiment of FIG. 1, at step 108, the media server 120 transmits the media asset with the interactive text comments to a viewer device 140. For example, the media server 120 may provide a graphical user interface to viewer device 140 which includes the media asset and the text comments received from user devices 130. The media server 120 may cause display of the media asset and the text comments through the graphical user interface, such that a viewer of the media asset has the option to view the text comments, including a text comment modified with the multimedia link. Practical examples for identifying text strings, modifying text strings, and displaying results when a multimedia link is selected are described further herein with respect to FIG. 2-9.

Figure 2:
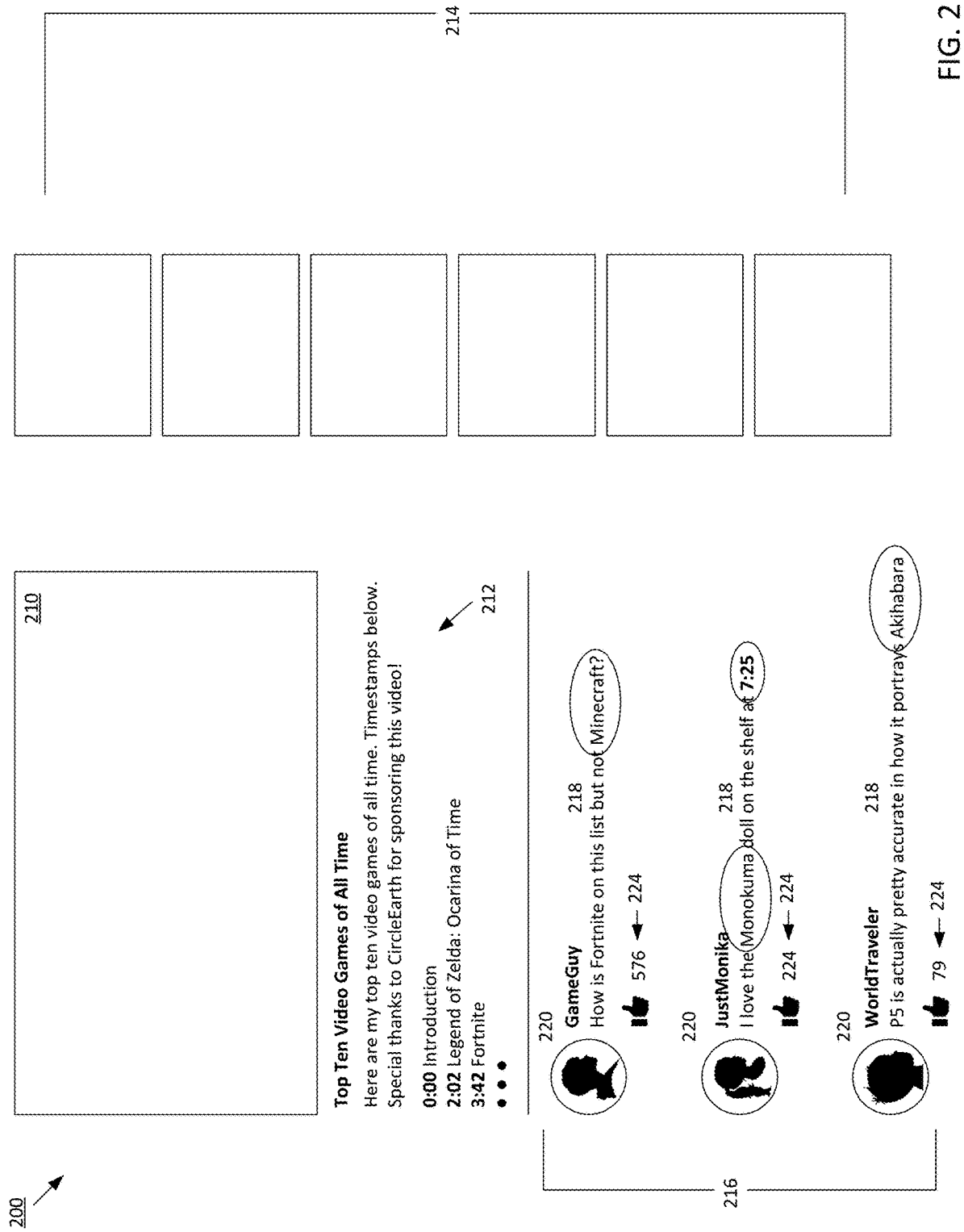
FIG. 2 depicts an example embodiment of a user interface where text in comments is identified for generating a multimedia link.

FIG. 2 depicts an example embodiment of a user interface where text in comments is identified for generating a multimedia link. Each of FIG. 2-9 provide examples of graphical user interfaces that are displayed on one or more computing devices for performing the methods described herein. Other embodiments may utilize more or less interface elements. Additionally, why FIG. 2-9 depict an interface where the media asset provided comprises a video, other embodiments may be performed where the provided media asset comprises any other type of media asset, such as audio, text, or images.

Interface 200 comprises a first media asset 210, first media asset information 212, identifiers 214 of a plurality of second media assets, and text comments 216.

The first media asset 210 comprises a media asset provided by a media server, such as in response to a request from a user device to play the media asset. In the example of FIG. 2, the media asset is a video with the title "Top Ten Video Games of All Time." The interface may include options to play the video while continuing to display the text comments 216 and the identifiers 214. The first media asset information 212 comprises information relating to the first media asset, such as a title of the first media asset, a description of the first media asset, a user profile through which the first media asset was posted, or tags comprising terms related to the first media asset. The first media asset information 212 may comprise information generated through input from a client computing device prior to or after uploading of the first media asset by the client computing device or other computing device that is signed into a same user account as the client computing device. Other metadata relating to the first media asset 210 may be stored but not displayed in the first media asset information 212. For example, in some embodiments, tags may be generated for the video but not displayed in the first media asset information 212.

Identifiers 214 comprise identifiers of a plurality of different media assets which are recommended for viewing. The plurality of different media assets may be recommended based on popularity, information relating to a user profile of a viewer such as a past viewing history or data defining subscribed channels, metadata of the first media asset, or a combination thereof. Metadata of the first media asset may include the title of the first media asset, keywords in the description of the first media asset, a defined genre of the first media asset, and/or tags generated for the first media asset. The media server may perform a search through media assets provided by the media server using terms from the metadata of the first media asset.

Text comments 216 comprise a plurality of comments generated for the first media asset, such as through a computing device which has provided authentication information for a user profile. Each of text comments 216 comprises comment text 218, commentor information 220, and comment reactions 222. Comment text 218 comprises information previously entered into a comment field by one or more users. For example, the comment text for the first comment reads "How is Fortnite on this list but not Minecraft?" The aforementioned comment text may have been entered into a comment field corresponding to the first media asset and submitted by a computing device. The commentor information may include metadata corresponding to the computing device, such as user profile information, submission time, commentor location, or other information relating to the commentor or the comments. The user profile information may include a user profile image, description, and/or user name. Additional user profile information may be stored with respect to the user account but not displayed on the interface, such as descriptions, past video postings, or other information relating to the profile or device.

Comment reactions comprise one or more indicators of responses to the text comment received from other computing devices. For example, a computing device may display a text comment with an option to leave a reaction, such as to indicate approval, disapproval, or other emotion, or to leave a reply comment with additional text, images, audio, or video. The computing device may receive input selecting an option to leave a reaction and transmit data indicating the selection to the media server which aggregates the reactions and displays them on the interface. Thus, the first comment in FIG. 2 received a reaction selection from 576 different devices.

The text 218 of the text comments may be analyzed to identify one or more text strings for turning into interactable elements. In the embodiment of FIG. 2, three text strings were identified based on the analysis, "Minecraft" in the first text comment, "Monokuma" in the second text comment, and "Akihabara" in the third text comment. While FIG. 2 depicts only single word text strings, embodiments described herein may identify text strings comprising any number of words. Additionally, while in FIG. 2 a single text string is identified in each comment, embodiments described herein may identify multiple text strings in a single comment and/or identify text strings in only a subset of the comments.

Text strings in the text comments may be identified through analysis of the text comments using any of a number of techniques including, but not limited to, identifying known keywords in the text comments, identifying text strings based on number of occurrences, identifying text strings based on uniqueness of terms, identifying descriptive words in text strings, identifying comments with a highest number of interactions, identifying text strings repeated in replies to comments, identifying previously searched terms, identifying matching products, identifying matching locations, or any combination thereof. Each of the aforementioned methods are described further herein.

Identifying known keywords in the text comments may comprise storing data identifying key words. For example, metadata for a plurality of media assets may include tags that are generated by the uploader of the media asset, other viewers, or the media server which comprise keywords for identifying the media asset in the search. The media server may aggregate the tags for the videos and store data identifying each of the tags as a keyword. In an embodiment, only a subset of the tags are stored as keywords, such as tags that have been repeated a threshold number of times across media assets and/or a top percentage, such as top ten percent, of tags based on a number of times the tags have been repeated across media assets. The media server may iterate through words or groupings of words and compare the identified words to the stored keywords. Words that match the stored keywords may be identified as candidates for generating interactable elements.

Identifying text strings based on number of occurrences may comprise comparing text strings across the comments to identify a number of occurrences of the text strings. In an embodiment, the system determines, for each text string, a number of times the text string occurred within the text comments for the media asset and a length of the text string. The media server may be configured to identify, as candidates for generating interactable elements, text strings that maximize both a number of occurrences and a text string length. For instance, the media server may compute a candidate value for each text string as:

$$C = w_1 O + w_2 l$$

where $C$ is the candidate value, $O$ is the number of occurrences, $l$ is the text string length, and $w_1$ and $w_2$ are weights that are preselected, such as 0.5 for $w_1$ and 1 for $w_2$. The media server may select as candidates a top percentage of the text strings based on the candidate value or each text string with a candidate value greater than a threshold.

Identifying text strings based on uniqueness of terms may comprise comparing text strings for the media asset to text strings in comments or metadata of other media assets. For example, the media server may store data identifying different text strings across a plurality of media assets and a number of instances of those text strings. The media server may identify text strings that are uncommon across other media assets, such as text strings with a number of instances less than a threshold number of in a bottom percentage, such as a lower ten percent, of number of instances. The media server may additionally determine a number of occurrences of the text string in comments for the media asset. The media server may be configured to identify, as candidates for generating interactable elements, text strings that minimize a number of occurrences across the plurality of media assets while maximizing a number of occurrences for the media asset. For instance, the media server may compute a candidate value for each text string as:

$$C = w_1 O_m - w_2 \sum_{j=1}^{n} \frac{O_j}{n}$$

where $O_m$ is the number of occurrences for the current media asset, $O_j$ is the number of occurrences for the jth media asset of the n media assets, and $w_1$ and $w_2$ are weights that are preselected, such as 0.5 for $w_1$ and 1 for $w_2$. The media server may select as candidates a top percentage of the text strings based on the candidate value or each text string with a candidate value greater than a threshold.

Identifying descriptive words in text strings may comprise storing data identifying descriptive words. For example, the media server may store data identifying a plurality of common descriptors, such as country designations (e.g. "Japanese") or vehicle descriptors (e.g. "model"). The media server may iterate through words or groupings of words and compare the identified words to the stored descriptors. Words that match the stored descriptors may be used to identify candidates for generating interactable elements. For example, the media server may identify a noun phrase that begins with the descriptor in the text and select the noun phase as a candidate syllable.

Identifying text strings based on comments with the highest number of interactions may comprise determining, for the text comments, a number of interactions of one or more types. The types may include reading the comment, hovering or positioning a mouse cursor over the comment, selecting an option to leave an interaction (e.g. a "like") on a comment, replying to the comment, selecting an option to read replies to the comment, or selecting the comment or user profile corresponding to the comment. The media server may identify comments with a highest number of interactions as candidate comments. The media server may then search for text strings within the candidate comments, such as by identifying nouns, proper nouns, or noun phrases in the comments and/or using any of the aforementioned techniques, and select the identified text strings as candidates for generating interactable elements.

Identifying text strings repeated in replies to comments may comprise comparing text strings in the comment to text strings in replies to the comment. The media server may be configured to identify text strings that are repeated a highest number of times in the replies to the comments. The media server may additionally identify text strings based on text string length or uniqueness across other text comments to identify candidates for generating interactable elements, such as by using any of the aforementioned methods.

Identifying previously searched terms may comprise storing data identifying search terms entered into a graphical user interface when searching for other media assets. For example, each time a search is performed for media assets, the media server may store data identifying the search terms and/or incrementing a value indicating a number of times a search term was used. In an embodiment, only a subset of the search terms entered into the interface are identified as previous search terms, such as search terms that have been repeated a threshold number of times across searches and/or a top percentage, such as top ten percent, of search terms based on a number of times the search terms have been repeated across searches. The media server may iterate through words or groupings of words and compare the identified words to the previous search terms. Words or groupings of words that match the stored previous search terms may be identified as candidates for generating interactable elements.

Identifying matching products may comprise searching for a product in a stored data structure and/or third party search. For example, the media server may store data identifying a plurality of products and compare the text strings to the stored data to identify text strings that match a name of a product. Additionally or alternatively, the media server may enter the text strings into an external search, such as through an API of a product listing application, and request search results for the text strings. The media server may identify text strings that generated search results generally, generated a threshold number of search results, and/or generated search results with a highest determined relevance.

Identifying locations may comprise searching for a location in a stored data structure and/or third party search. For example, the media server may store data identifying a plurality of locations and compare the text strings to the stored data to identify text strings that match a name of a location. Additionally or alternatively, the media server may search enter the text strings into an external search, such as through an API of a mapping or travel application, and request search results for the text strings. The media server may identify text strings that generated search results generally, generated a threshold number of search results, and/or generated search results with a highest determined relevance.

In some embodiments, a subset of the candidates generated using the methods described herein may be used to generate the interactable elements. For example, the candidates may be ranked based on candidate score, length of text string, uniqueness of text string, prevalence of text string in comments and/or replies, a number of interactions on the comment, a number of search results for the text string, a number of times the text string was used in a search, or any combination thereof. Based on the ranks, a subset of the text strings may be selected. For example, the media server may select a predetermined number of text strings, such as multiplier of the number of comments, thereby ensuring a similar distribution of interactable elements among different types of videos. Additionally or alternatively, the media server may select text strings with a ranking above a threshold value and/or in a top percentage of rankings.

In an embodiment, the text comments are pre-filtered to remove specific terms from analysis to be interactable elements. The specific terms may include articles, common responses, or other ubiquitous data. Additionally or alternatively, the specific terms may include terms identified in metadata of the media asset and/or terms used to search for recommended media assets. For example, the media server may compare text strings to terms in the metadata of the media asset and only generate interactable elements for terms that do not match the metadata. Thus, in FIG. 2, the metadata of the media asset includes the term "Fortnite" in the description, but not "Minecraft." Thus, in the first comment, "Fortnite" is not identified as a candidate for generating interactable elements, but "Minecraft" is. By only generating interactable elements from terms that are not listed in the metadata of the media asset and/or not used as part of the search for the recommended media assets, the media server removes duplicated results between the comment text and the media asset recommendations. For instance, while the term "Fortnite" may have been used to identify a media asset recommendation based on the existence of the term in the descriptor of the video, the term "Minecraft" may not have been used to identify a media asset recommendation as the term was not in any of the metadata of the video.

In an embodiment, the media server identifies text strings in the comments based on a determination that the comment contains additional information, such as based on metadata corresponding to the device on which the comment was generated. For instance, the media server may determine that a comment contains additional information based on a determination that a commentor has expertise in a topic of the comment or media asset, an identified location having been visited by a commentor, specific versions of general terms, a number of reactions to the comment, previous comments by the commentor matching metadata of the media asset, and/or data defining an amount of the media asset consumed by the commentor. If the media server determines a comment contains additional information, the media server may analyze the comment for text strings to generate interactable elements using methods described herein.

In an embodiment, determining that the comment contains additional information comprises determining that a user corresponding to a user profile that posted the comment has expertise in a topic of the text comment or the media asset. The topic of the media asset may be determined based on the title and/or other metadata of the video. The topic of the text comment may be determined based on text strings in the text comment, such as by identifying unique terms in the text comment. The media server may determine that the user corresponding to the user profile that posted the comment has expertise in the topic of the comment or media asset based on a search history corresponding to a user profile, a watch history corresponding to the user profile, application usage history of the user profile, and/or comment history of the user profile. For example, if videos previously posted by the user profile contain words pertaining to the topic, the media server may determine that the user has expertise in the topic.

In an embodiment, determining that the comment contains additional information comprises determining, from device metadata and/or application usage history, that a user corresponding to the user profile that posted the comment has been to a location identified in the comment. For example, metadata of a device may identify previous locations visited by a user of the device or a map application may provide previous travel history of the device. The media server may cross-reference the text of the comment with visited locations to determine whether any of the text matches a visited location. If any of the text matches a visited location, the media server may determine that the comment containing the text contains additional information and may select the text to generate an interactable element. For example, in FIG. 2, the media server may identify the location of "Akihabara" as a location where a device corresponding to the profile of "WorldTraveler" was identified.

In an embodiment, determining that the comment contains additional information comprises determining a feature of a profile of the commentor, such as whether the commentor profile is associated with a public figure and/or is an uploader of popular videos. In some embodiments, the feature of the commentor is used to perform the searches for identifiers of other media assets. For example, if a feature of the profile is that the profile has uploaded right-leaning political videos, media assets identified for a text string that identifies a political figure may cause display of media assets with a right-leaning perspective of the political video.

In an embodiment, determining that the comment contains additional information comprises identifying one or more specific terms that modify one or more general terms. For example, the media server may identify a general term in a plurality of comments, such as the term "gardens." The media server may determine if any of the comments contain specific terms that modify the term "gardens," such as the term "zen" or "tea" before the word "gardens." If a comment contains the more specific terms, the media server may determine that the comment contains additional information.

In an embodiment, determining that the comment contains additional information comprises determining that a number of reactions to the comment exceeds a threshold or is within a top number or percentage of number of reactions received by comments for the media asset. Thus, the comments with the most reactions may be identified as containing additional information.

In an embodiment, determining that the comment contains additional information comprises comparing previous comments made by the commentor user profile with metadata of the media asset, such as a title of the media asset or tags of the media asset. If a threshold number of previous comments made by the commentor profile match the metadata of the media asset, the media server may determine that the comment contains additional information.

In an embodiment, determining that the comment contains additional information comprises determining that more than a threshold amount of the media asset was consumed by the device from which the comment was received. For example, the media server may track an amount of a media asset played by the device prior to the device transmitting the comment to the media server. If the tracked amount of the media asset played by the device does not exceed a threshold, such as half of the media asset, the media server may determine that the comment does not contain additional information.

In an embodiment, the media server stores identified text strings as metadata for the media asset. The stored text strings may be the text strings used to generate interactable elements, a subset of the text strings used to generate interactable elements, such as the text strings with the most selections, or other text strings in comments that were identified as containing additional information. In this manner, the comments may be used to improve the metadata for a particular media asset.

In some embodiments, the media server additionally identifies timestamps within the comments. For example, in FIG. 2 the second comment includes a timestamp of 7:25 at the end of the comment. The media server may be configured to search for text strings in a comment based on the identification of the timestamp. Identification of the timestamp may be performed by identifying numbers in the form of a timestamp (e.g., ##:##) and/or identifying a timestamp link entered into the comment. In an embodiment, the media server is further configured to store data associating the identified text string with the timestamp. For instance, the media server may store data associating the text string of "Monokuma" with the timestamp of 7:25.

FIG. 3 depicts an example embodiment of a user interface where text in comments is replaced with an interactable element. In interface 300 of FIG. 3, the text comments 302 comprise interactable elements 304. The interactable elements 304 replace and/or are provided in conjunction with the text strings from which the interactable elements 304 were generated. For example, the interactable element may be designed to take the appearance of the text string or to be overlayed over or near the text string. In an embodiment, the display of the text string is altered to indicate that the text string contains an interactable element, such as by changing the color of the text string, highlighting the text string, changing a font of the text string, or applying additionally effects, such as bold, underline, or shadow, to the text string.

The interactable element comprises an interface display which performs one or more functions when an interaction with the interactable element is detected. The interaction may include any of a selection of the interactable element, placement of a mouse cursors over the interactable element, selection of the comment that includes the interactable element, and/or any other method of detecting interaction with an option in a graphical user interface.

In an embodiment, the function performed in response to the interaction with the interactable element comprises navigating to a webpage or application where a search is performed for the text string. For example, the interactable element may comprise a hyperlink which includes a destination address and/or a term to be searched at the destination address. When the interactable element is selected, the user device may navigate to a new webpage and/or open a new window, tab within a window, or an application designated by the hyperlink. The new window, tab, or application may include a search function. When the new window, tab, or application is opened, the search may be performed using the interactable element. For example, if the interface with the media assets are displayed through a browser, a new browser tab may be opened with a search for other media assets provided by the media server. Additionally or alternatively, the new window, browser, or application may be provided by an entity other than the media server, such as an information search interface or a product search interface.

In an embodiment, the function performed in response to the interaction with the interactable element comprises displaying, on a same interface as the first media asset, identifiers of media assets corresponding to the text string. For example, the media server may perform a search for media assets provided by the media server using the text string. The search may be performed when the interactable element is generated or when the interactable element is selected. The media server may display one or more identifiers of media assets identified as a result of the search in a window displayed over the graphical user interface in response to the interaction with the interactable element. The window may be displayed on or near the text string, such that the window does not completely obscure the interface. Thus, the window which includes the identifiers of the media assets may be displayed in conjunction with identifiers recommended media assets and/or the viewed media asset.

In an embodiment, the searches described herein utilize additional information in addition to using the text string as a search term. The additional information may include metadata relating to the displayed media asset, metadata relating to the text comment, and/or metadata relating to the device on which the selection is made. The additional information may be added to the search query, used to filter results of the search query, and/or used to sort results of the search query. For example, the media server may perform a search for the identified text string, such as "Minecraft," and then filter the results based on other terms in the text comment, such as "Fortnite."

Metadata relating to the displayed media asset which is used as additional information may include terms in the title of the media asset, generated tags for the media asset, terms in a description of the media asset, profile information of an account through which the media asset was posted, and/or data relating to other media assets which have historically been consumed by devices that consumed the displayed media asset. The profile information of the account may include a profile name, a profile description, demographic data of the account, other media assets posted by the account, media assets identified to be similar to other media assets posted by the account, accounts identified as being similar to the account, and/or media assets consumed by the account.

Metadata relating to the text comment may include other text in the text comment, profile information of the commentor account, or text of replies to the text comment. The profile information of the commentor account may include a profile name, a profile description, demographic data of the account, other media assets consumed by the account, other media assets on which the account provided comments, accounts corresponding to other media assets consumed by the account, accounts to which the commentor account is subscribed, or any other additional tracked data relating to a device of the commentor account, such as purchase history, travel history, or search history.

Metadata relating to the device on which the selection is made may include profile information of the viewing account. The profile information of the viewing account may include a profile name, a profile description, demographic data of the account, other media assets consumed by the account, other media assets on which the account provided comments, accounts corresponding to other media assets consumed by the account, accounts to which the viewing account is subscribed, or any other additional tracked data relating to a device of the viewing account, such as purchase history, travel history, or search history.

Figure 4:
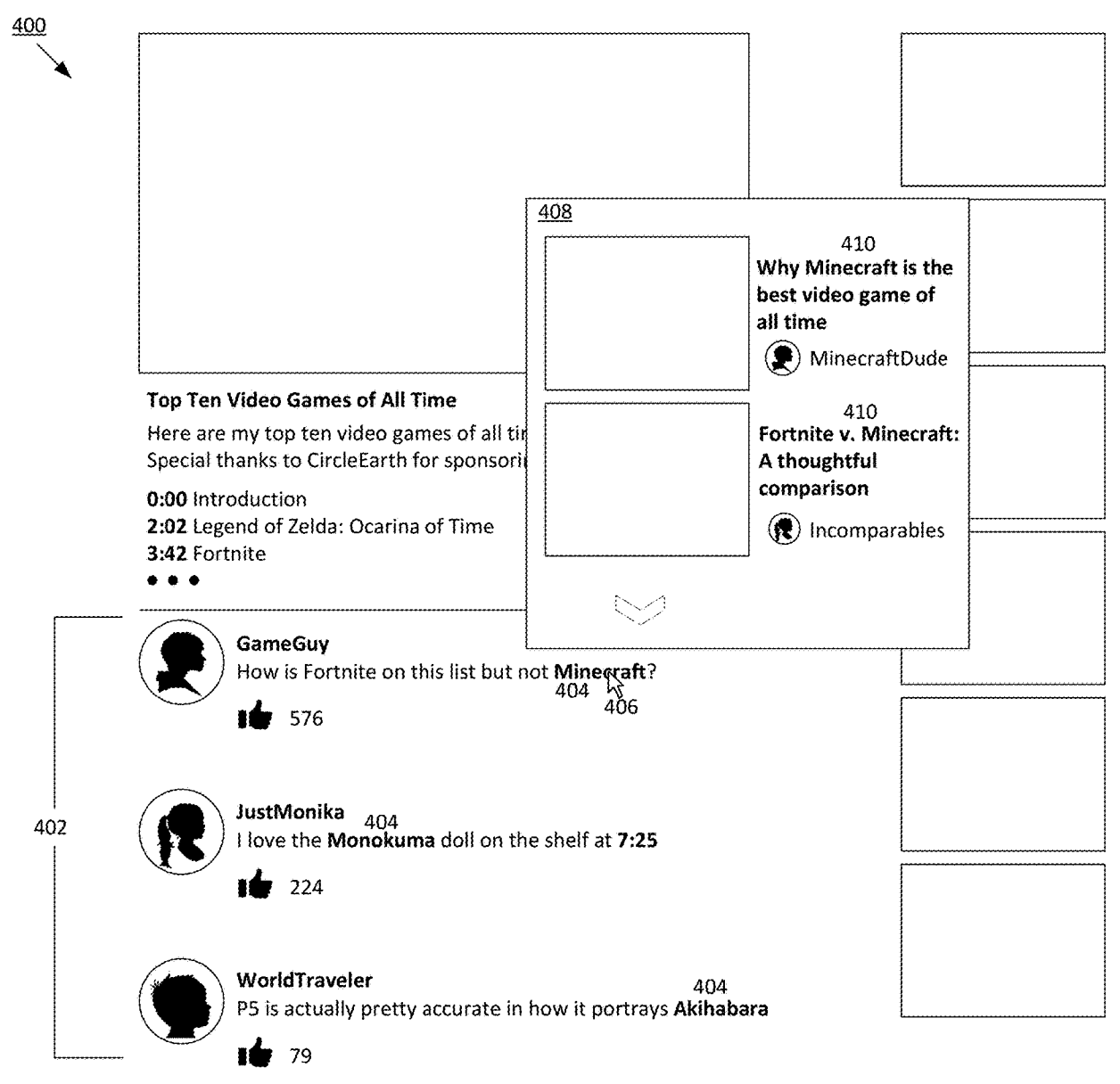

FIG. 4 depicts an example embodiment of a user interface where input interacting with a multimedia link causes simultaneous display of a media asset, identifiers of recommended media assets, and identifiers of media assets identified based on the text of the multimedia link. In interface 400 of FIG. 4, the text comments 402 comprise interactable elements 404. A cursor 406 is depicted interacting with one of the interactable elements 404. The interaction may include hovering over the interactable element or input selecting the interactable element, such as a click of the interactable element.

In response to the interaction with the interactable element, interface 400 displays window 408. Window 408 is displayed as an overlay over interface 400. The window includes identifiers 410 of other media assets identified through the search. For example, the search for videos with the search term "Minecraft" produced the two results depicted in window 408. Additional results may be displayed in window 408 in response to a selection of the down-arrow. By depicting identifiers of media assets relating to terms in the comments in a window overlay, the system provides an uncluttered user interface which provides options for displaying relevant videos, as different selections may cause display of different media asset identifiers based on the selected text string. In response to selection of one of the identifiers 410, the media server may cause the viewer device to navigate to a new page where the media asset corresponding to the identifier is displayed. Additionally or alternatively, the media asset may be displayed in a window, such as window 408, displayed on interface 400.

In an embodiment, displaying the identifiers of the media assets corresponding to the text string comprise displaying the media assets along with the recommended media assets. For example, the media server may perform a search for media assets based on the text string and display identified media assets along with the identifiers of recommended media assets. Additionally or alternatively, the media server may use the selection to filter or reorder the identifiers of the recommended media assets. For example, in response to a selection of "Minecraft," the media server may identify recommended videos that include "Minecraft" in the title or metadata and move the identified videos to the top of the list of identifiers of recommended videos.

Figure 5:
FIG. 5 depicts an example embodiment of a user interface where input interacting with a multimedia link causes display of identifiers of media assets based on the text of the multimedia link to be displayed in a recommendations section of the user interface.

FIG. 5 depicts an example embodiment of a user interface where input interacting with a multimedia link causes display of identifiers of media assets based on the text of the multimedia link to be displayed in a recommendations section of the user interface. In interface 500 of FIG. 5, the text comments 502 comprise interactable elements 504. A cursor 506 is depicted interacting with one of the interactable elements 504. The interaction may include hovering over the interactable element or input selecting the interactable element, such as a click of the interactable element.

In response to the interaction with the interactable element 504, interface 500 depicts identifiers 510 of media assets identified through a search based on the text string along with the identifiers 508 of recommended media assets. Identifiers 510 may comprise identifiers that were initially a part of recommended media assets. For example, the media server may search through the recommended media assets for any media assets which include the term "Minecraft" in response to the selection of the interactable element for "Minecraft" and cause the resulting media assets to be displayed prior to other media assets, such as by moving any identified media assets to the top of a list, displaying the identified media assets in a first page of media assets, or otherwise prioritizing display of the identified media assets. Additionally or alternatively, the media server may perform a search for media assets based on the selection of "Minecraft" and populate at least a portion of the recommended media assets with the search results.

While FIG. 5 depicts the searching, filtering, or sorting being performed in response to a selection of the interactable element in the text string in the text comment, in other embodiments the identified text string is used to generate a separate filter or sort option. For example, the media server may display a plurality of sort or filter options above the identifiers of the recommended media assets. One or more of the options may be generated in response to identifying the text string in the text comment. Additionally or alternatively, in response to a selection of the text string in the text comment, the interface 500 may update the plurality of sort or filter options to include the identified text string.

In an embodiment, the function performed in response to the interaction with the interactable element comprises causing display of comments that include the text string. For example, the interface 500 may sort or filter the comments based on the selected text string such that comments that include the text string or have replies that include the text string are displayed first. As with the filter of the media assets, the option to sort or filter the comments based on the text string may be included in the interactable element in the text string in the comment and/or as a separate filter or sort option generated based on identifying the text string in the comment.

In an embodiment, the interactable text strings are used to determine an ordering of the comments. For example, comments that contain interactable text strings may be prioritized over comments that do not contain interactable text strings. As another example, comments maybe sorted based on a number of interactions with interactable text strings in the comments. For instance, comments with text strings that have a highest number of interactions may be sorted with comments that have a highest number of interactions with the interactable elements being displayed first. Additionally or alternatively, the sorting may be weighted based on a type of interaction. For example, moving a cursor over the interactable element may be weighted lower than selecting an identifier of another media asset based on the interactable element.

FIGS. 4 and 5 depict embodiments where the identifiers of media assets comprise identifiers of media assets provided by the media server. Thus, the searches performed for FIGS. 4 and 5 comprise searches of a data repository identifying media assets provided by the media server. In other embodiments, the media server may be configured to send a search query to one or more external servers, such as through an API of an application provided by the one or more external servers or through a search interface provided by the one or more external servers, where the search query comprises the text string as a search term. Additionally or alternatively, the media server may store data identifying media assets of the external server and may perform a search through the stored data.

The search results for media assets provided by external servers, such as through different platforms, may be provided in a similar interface as depicted in FIG. 4 or 5. For instance, the media server may display identifiers of media assets identified from searches through external platforms. The identifiers may be displayed along with identifiers of media assets identified through a search of media assets provided by the media server.

Figure 6:
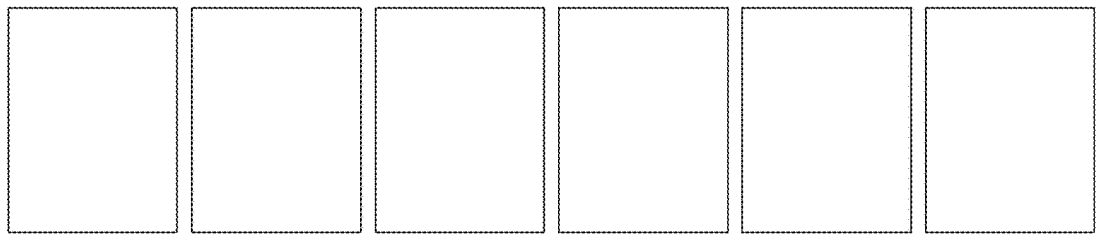
FIG. 6 depicts an example embodiment of a user interface where input interacting with a multimedia link causes display of identifiers of media assets hosted by different platforms.

FIG. 6 depicts an example embodiment of a user interface where input interacting with a multimedia link causes display of identifiers of media assets hosted by different platforms. In interface 600 of FIG. 6, the text comments 602 comprise interactable elements 604. A cursor 606 is depicted interacting with one of the interactable elements 604. The interaction may include hovering over the interactable element or input selecting the interactable element, such as a click of the interactable element.

In response to the interaction with the interactable element, interface 600 displays window 608. Window 608 is displayed as an overlay over interface 600. The window includes an identifier 610 of a media asset identified through a search through media assets provided by the media server. The window additionally includes an identifier 612 of a media asset provided by a first external platform and an identifier 614 of a media asset provided by a second external platform. Identifier 612 comprises an identifier of a product page where a product corresponding to the text string can be purchased. Identifier 614 comprises an identifier of an information page corresponding to the text string. Identifier 612 may be identified through a search of products provided by the RetailShopper platform. Identifier 614 may be identified through a search of information pages provided by the Learning Nexus platform. Additionally or alternatively, both identifiers may be identified through a search of a general repository that identifies pages provided by both the RetailShopper platform and the Learning Nexus platform.

In an embodiment, the identifiers of media assets provided by external platforms may comprise hyperlinks to websites corresponding to the search results. Thus, in response to a selection of an option from an external platform, the viewing device may navigate to a page corresponding to the external platform. For example, in response to a selection of identifier 614, the viewing device may navigate to a web page hosted by Learning Nexus which corresponds to "Monokuma." Additionally or alternatively, the media server may use an API provided by an external platform to provide access to the platform functionality from the interface. The navigation to the web page may be performed in window 608, in a separate window or tab, or as a navigation from a web page that include interface 600.

The media server may request an interface from the external platform through the API and cause display of the interface from the external platform in the same window or in a separate window. For example, in response to a selection of identifier 612, the media server replace identifier 612 with an image of the product provided by the external server with additional information, an option to complete a purchase, and an option to view a full webpage. If the option to complete the purchase is selected, the media server may facilitate authentication of a user account through the API, such as providing known credentials, or the external server may authenticate the user directly and complete the transaction. As the transaction is completed through the displayed window, the transaction does not interrupt a media asset viewing session.

In an embodiment, identifiers of media assets provide from external sources have different visual indicators than identifiers of media assets provided by the media server. For instance, different icons are depicted in FIG. 6 for video assets, the product platform, and the information platform. Additionally or alternatively, other visual indications may be provided to distinguish between the different platforms. For example, the identifiers of media assets from the media server may have a border of a first color, identifiers of media assets from an external server through which information is provided through an API may have a border of a second color, and identifiers of media assets from an external server where the identifier comprises a hyperlink to a different website may have a border of a third color. In this manner, the interface may distinguish between options which will cause the device to navigate away from interface 600, such as through a hyperlink to a different website, and options that will cause the device to display additional information or windows through interface 600.

Figure 7:
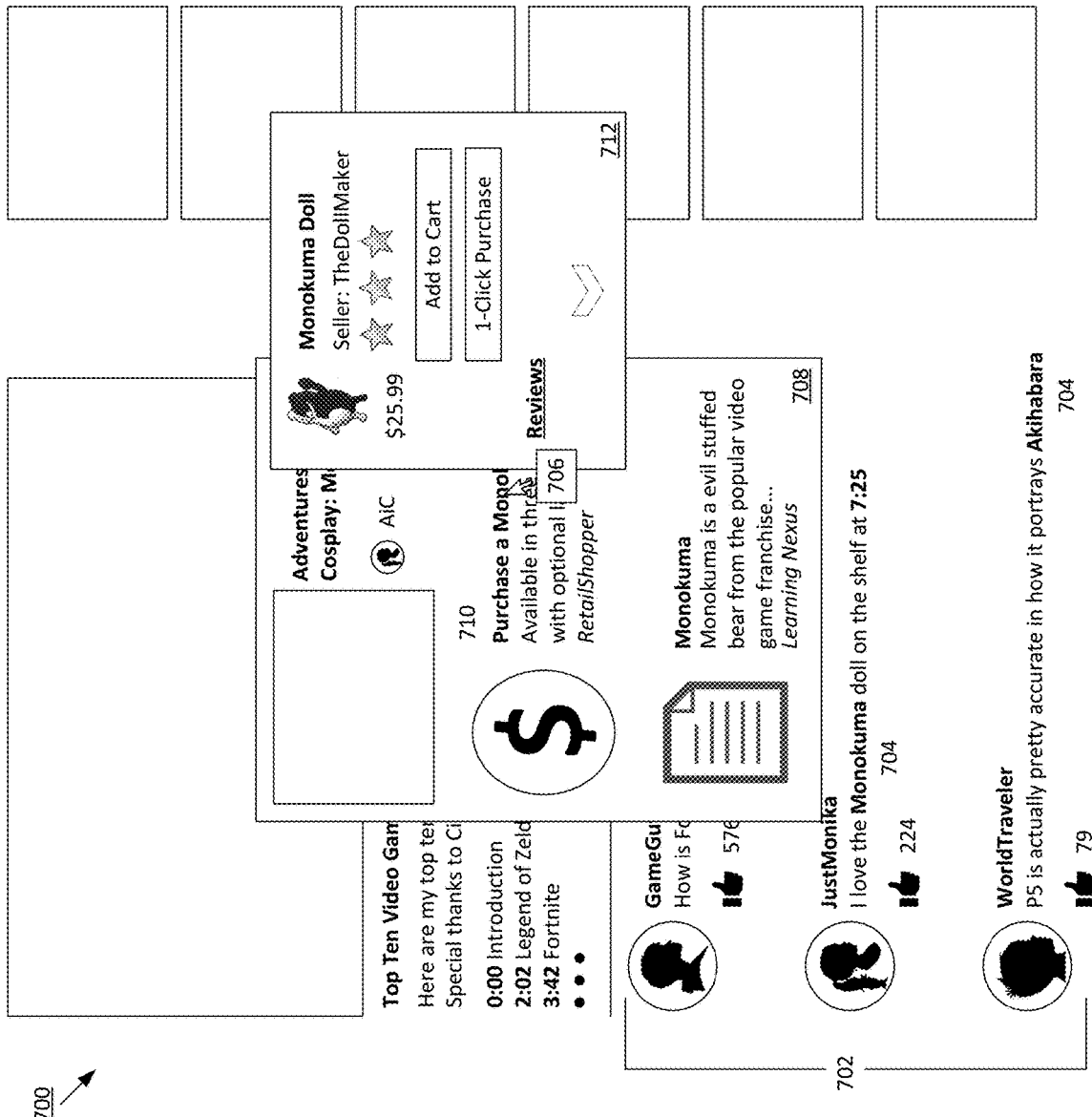
FIG. 7 depicts an example embodiment of a user interface where input interaction with a displayed identifier of a media asset hosted by a different platform causes display of an additional window corresponding to the different platform.

FIG. 7 depicts an example embodiment of a user interface where input interaction with a displayed identifier of a media asset hosted by a different platform causes display of an additional window corresponding to the different platform. In interface 700 of FIG. 7, the text comments 702 comprise interactable elements 704. A cursor 706 previously interacted with one of the interactable elements 704. The interaction may include hovering over the interactable element or input selecting the interactable element, such as a click of the interactable element.

In response to the interaction with the interactable element, interface 700 displayed window 708. Window 708 is displayed as an overlay over interface 700. The window includes an identifier 710 of a media asset identified through a search through media assets provided by an external platform. The cursor 706 is depicted as interacting with the identifier 710 of the media asset identified through the search through media assets provided by the external platform. In response to the selection, interface 700 displays external platform window 712. External platform window 712 comprises a window where contents of the window are provided by an external platform, such as through a website or through an API of the external platform. In the example, the external platform comprises a product platform with options for reviewing a product and for purchasing the product.

In some embodiments, the media server is configured to search through specific external platforms for each identified text string. In other embodiments, the media server performs a general search through a search interface which searches a plurality of different platforms. Additionally or alternatively, the media server may be configured to search platforms based on a type of text string identified. For example, in response to detecting a text string that corresponds to a location, the media server may be configured to search a travel listing platform and/or a maps platform.

Figure 8:
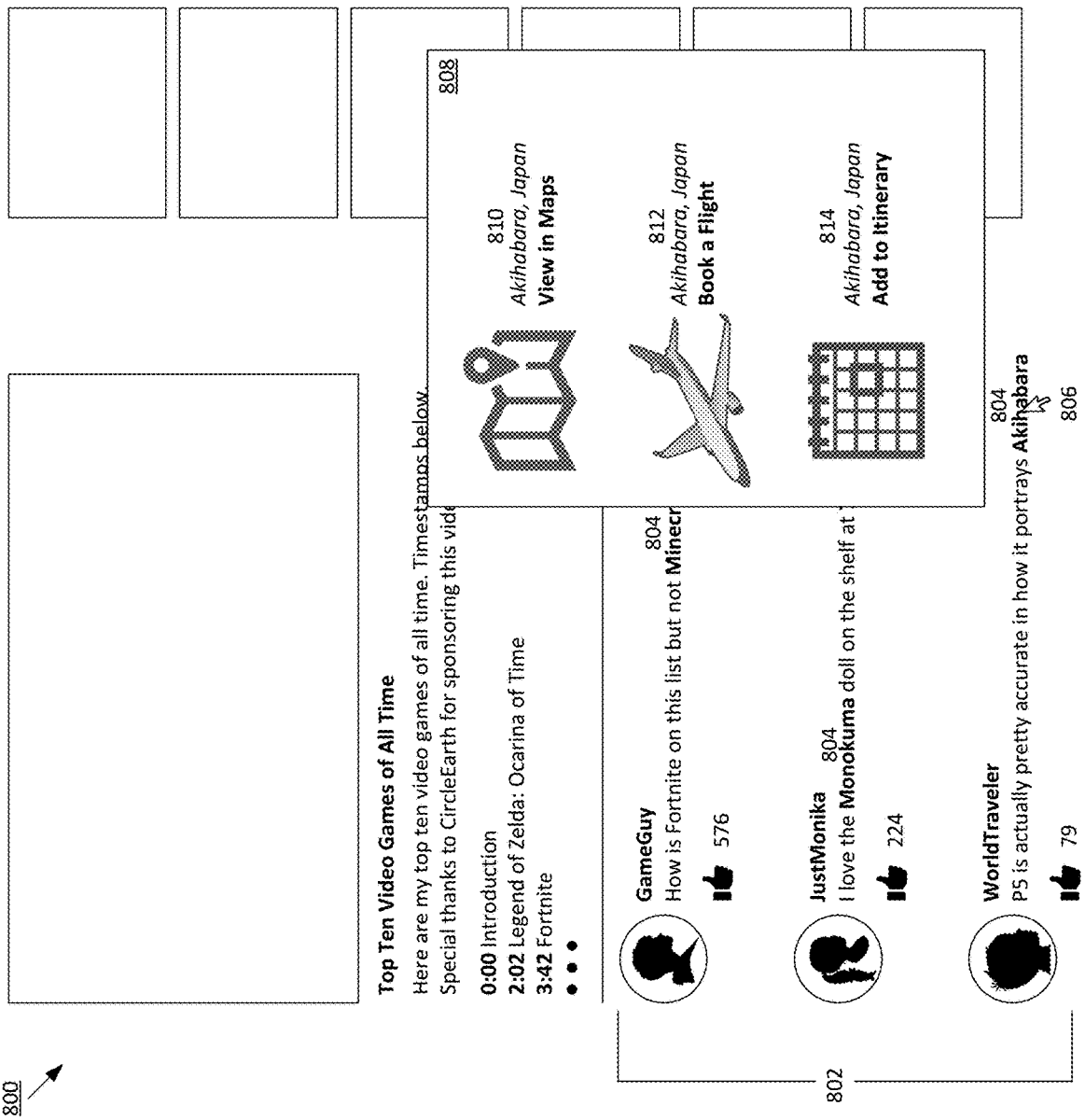
FIG. 8 depicts an example embodiment of a user interface where input interacting with a multimedia link causes display of identifiers of media assets based on an identified location.

FIG. 8 depicts an example embodiment of a user interface where input interacting with a multimedia link causes display of identifiers of media assets based on an identified location. In interface 800 of FIG. 8, the text comments 802 comprise interactable elements 804. A cursor 806 is depicted interacting with one of the interactable elements 804. The interaction may include hovering over the interactable element or input selecting the interactable element, such as a click of the interactable element.

In response to the interaction with the interactable element, interface 800 displays window 808. Window 808 is displayed as an overlay over interface 800. In an embodiment, in response to the text string containing an identifier of a location, window 808 includes identifiers 810, 812, and 814 which correspond to platforms which utilize locations. Selection of the identifiers may cause a user device to execute applications corresponding to the identifiers, the user device to navigate to a webpage corresponding to the identifiers, or cause the interface to display, through window 808 or a separate window, data retrieved from an external server. Identifier 810 comprises an identifier of the location as identified through a map platform. Thus, a selection of identifier 810 may cause display of the identified location in the map, such as through window 808 or a separate window provided by the media server. Identifier 812 comprises an identifier of a travel listing page for booking a trip to the identified location. Thus, a selection of identifier 812 may cause the user device to display options to book a trip to the identified location through a travel listing application or website, such as through window 808 or a separate window provided by the media server.

While FIG. 2-8 generally describe display of identifiers of media assets, other application integrations may be utilized based on identified text string. For example, integration with a dictionary application may be utilized to provide a definition for the text string, integration with a translation application may be utilized to provide a translation for the text string, and integration with a planning application may be utilized to store data in association with a new plan. As an example of a planning application, a selection of an ingredient name may cause the media server to identify an application for a shopping list and provide an option to add the ingredient to the shopping list. As another example, identifier 814 in FIG. 8 comprises an identifier of an option to add a destination to an itinerary. In some embodiments, the media server may determine, based on itinerary information provided by a calendar application or travel information provided by a travel listing application, that a trip has been booked to a region that includes the location and, in response, may provide an option to add a stop at the location. For example, if the media server determines that a trip has been planned to Japan, window 808 in interface 800 may include the option to add a stop at Akihabara to an itinerary in response to a selection of the text string "Akihabara" in the text comment.

Embodiments described herein with respect to FIG. 2-8 depict the use of identified text strings in text comments to generate interactable elements in the text comments. These embodiments provide substantial improvements to the graphical user interface by generating new ways of displaying other media asset viewing options, integrating the display with external platforms, and leveraging additional information in a search or filtering of videos, such as commentor profile information or viewer profile information. The methods described herein may additionally be used to generate recommendations. For example, the media server may identify text strings using the methods described herein and use the identified text strings to generate recommendations for media assets. The recommendations may be based on a prevalence of a text string, a number of interactions with the text string, and/or viewer interaction with the text string. For example, text comments with the most interactions may be analyzed to identify text strings which are used to search for recommended content. As another example, the media server may augment recommendations for a user or user profile preference information based on detecting an interaction with a text comment and identifying a particular text string within the text comment.

In some embodiments, text stings are identified for generating recommendations for media assets based, at least in part, on interactions with text comments that include the text strings. For example, the media server may identify text comments that received a threshold number or highest number of replies, text comments that receive a threshold number or highest number of interface reactions, text comments that are displayed on one or more devices for greater than a threshold amount of time or for a highest amount of time, text comments over which a cursor has hovered for greater than a threshold amount of time or for a highest amount of time, and/or text comments that have a portion that has been copied more than a threshold number of times or a highest amount of times. "Highest," as used in this section, refers to one of a threshold number of top values. For example, the media server may identify comments that received the top five most interface interactions.

In some embodiments, the text strings in the text comments are used to augment display of the media asset corresponding to the text comments. For example, the media server may analyze the text strings in the text comments to identify a particular text string, such as a text string that maximizes one of the values described previously described herein. In an embodiment, the selected text string is one that is not identified in the metadata of the media asset. For example, the text string of "Minecraft" may be identified due to the term not being included in metadata of the media asset and due to a high volume of comments that include the term "Minecraft," a high number of interactions on the comment that includes the term "Minecraft," or an interaction by the viewing device with the comment including the term or the text string of the term itself. The identified particular text string may be used to identify supplemental content such as through a search of supplemental content stored by the media server and/or provided by an external server computer. The media server may augment display of the media asset with the supplemental content.

In an embodiment, augmenting the display of the media asset with the supplemental content comprises displaying the supplemental content before the media asset, after the media asset, or after pausing playback of the media asset. As a practical example, in response to identifying the text string "Minecraft" in the comments, the media server may request an advertisement for Minecraft from an advertisement server and cause the advertisement to play prior to the video.

In an embodiment, augmenting the display of the media asset with the supplemental content comprises displaying an overlay over the media asset. For example, the media server may identify and/or generate a banner for display at the top of a video. As a practical example, in response to identifying the "Monokuma" text string, the media server may generate a banner advertisement for a Monokuma doll. The media server may cause the banner advertisement to display over the media asset.

In an embodiment, the media server identifies a time within the media asset to augment the display of the media asset based on the text string or other information in the comment. In some embodiments, the media server identifies timestamps in the text comment and uses the timestamps to determine a time within playback of the media asset to augment the media asset. For example, the comment that includes the term "Monokuma" additionally includes a timestamp of 7:25. Based on the identified timestamp, the media server may cause display of the supplemental content at or near a point in time corresponding to the timestamp. For instance, if the video includes a first advertisement break at three minutes and a second advertisement break into the video, the media server may identify the second advertisement break at eight minutes as being closest to the timestamp of 7:25 and cause display of the supplemental content at a second advertisement break.

In some embodiments, the media server identifies other terms in the text comment and uses the other terms to determine a time within playback of the media asset augment the media asset. For example, in the first comment, the media server may identify the term "Fortnite" as another term in the comment including the text string "Minecraft." Based on the term "Fortnite," the media server may identify a portion of the video corresponding to the term "Fortnite," such as based on metadata of the video, analysis of the description of the video, analysis of the audio corresponding to the video, or analysis of subtitles of the video to identify times in the media asset when the term "Fortnite" is mentioned. For instance, the video description identifies a section relating to Fortnite starting at a timestamp of 3:42. Thus, the media server may identify the timestamp of 3:42 or a timestamp close to the timestamp of 3:42 for placing supplemental content relating to Minecraft.

In some embodiments, the media server analyzes audio of the media asset, subtitles for the media asset, and/or images of the media asset to identify a timestamp for the supplemental content. For example, the media server may identify subtitles that match the term "Akihabara" and determine a timestamp corresponding to the matching subtitles. As another example, the media server may identify an image corresponding to the term "Monokuma," such as through a search of an image repository and/or through an image of the supplemental content corresponding to the term "Monokuma." The media server may employ known image analysis techniques to identify an image in the video that matches the identified images corresponding to the term "Monokuma." The media server may use the timestamp of the identified image in the video to identify the timestamp for the supplemental content.

In some embodiments, the media server additionally analyzes the media asset to identify locations in the media asset for the supplemental content. For example, based on the identification of the image of "Monokuma" in the video, the media server may identify the location corresponding to the image as being a location for displaying supplemental content, such as a banner advertisement for a Monokuma doll. The media server may be configured to use timestamps or additional information in the text comments to determine which frames of the video to analyze. For example, for the "Minecraft" supplemental content, the media server may analyze frames of the video starting at 3:42 due to the inclusion of the term "Fortnite" in the comment and the indication of a timestamp corresponding to "Fortnite" in the video and/or due to audio or subtitles that include the term "Fortnite." Similarly, for the "Monokuma" supplemental content, the media server may analyze frames of the video at or near the timestamp of 7:25 based on the timestamp identified in the comment.

In some embodiments, augmenting the display of the media asset comprises making one or more portions of the media asset interactable. For example, the media server may analyze frames of a video to identify a location of a particular item corresponding to the supplemental content, such as a Monokuma doll. The media server may augment display of the media asset such that the location of the particular item at the timestamps that include the particular item contains an interactable element. In response to an interaction with the interactable element, the media server may display the supplemental content.

FIG. 9 depicts an example embodiment of modifying display of a media asset with supplemental content based on data from a text comment. In interface 900 of FIG. 9, the text comments 902 comprise identified text strings 904. The second of the identified text strings 904 is used to identify an image 906 in the video. An interactable element is overlaid over image 906. In response to a selection of the interactable element overlaid over image 906, the interface 900 displays supplemental content 908. Supplemental content 908, in the example of FIG. 9 comprises an option to purchase a product through an external server. The supplemental content 908 may comprise a static element, such as a description of the item, or a dynamic element which reacts similarly to input as FIG. 7's identifier 710.

Figure 10:
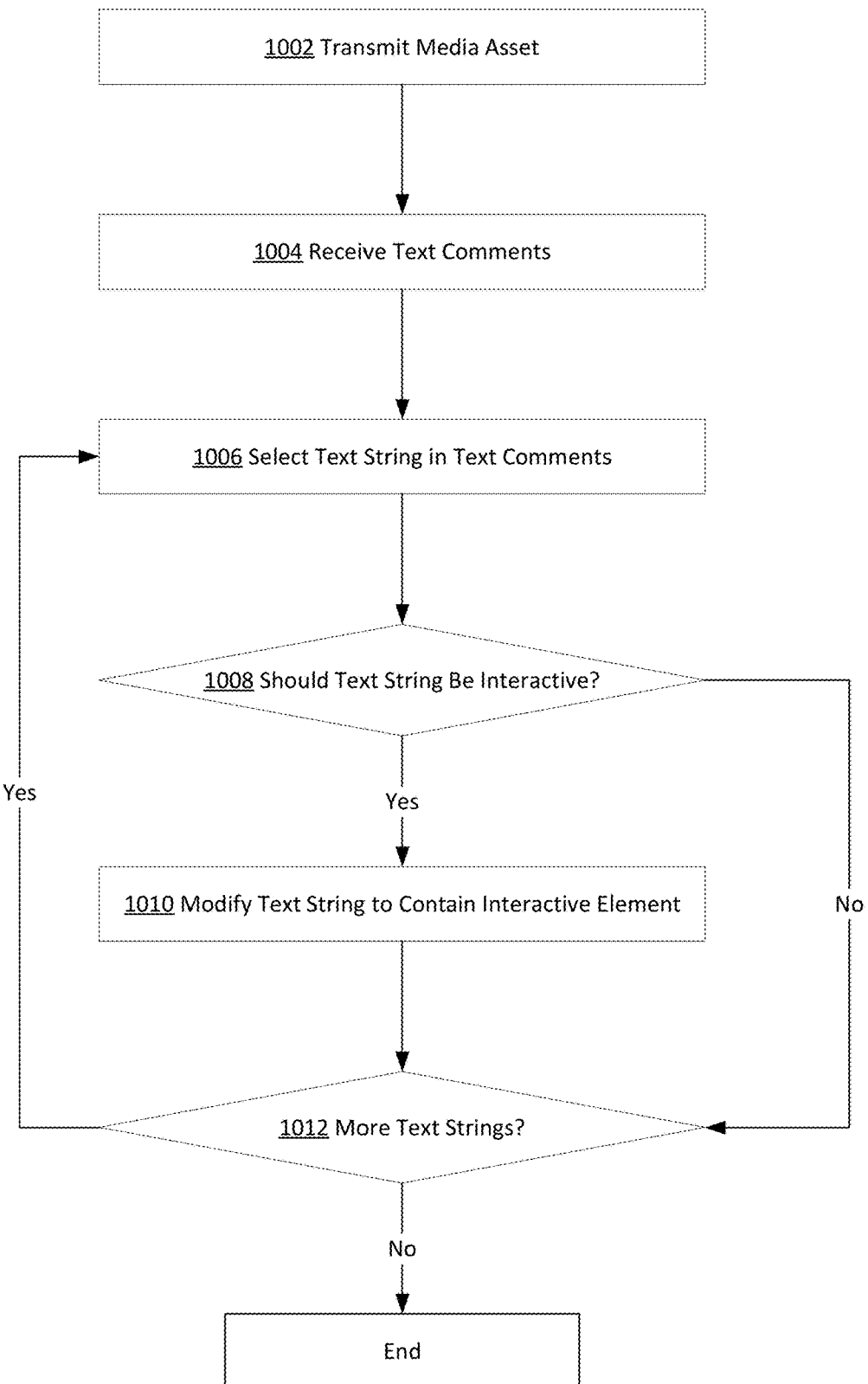
FIG. 10 depicts an example method for generating interactable text strings in comments based on text analysis.

FIG. 10 depicts an example method for generating interactable text strings in comments based on text analysis.

At step 1002, input/output circuitry of a server computer transmits a media asset to one or more devices. For example, the input/output circuitry of the server computer may provide a graphical user interface to one or more devices through which a media asset, such as a video, image, audio recording, or text, can be displayed.

At step 1004, input/output circuitry of the server computer receives text comments from the one or more devices. For example, the input/output circuitry may provide, within the graphical user interface, an option to generate one or more text comments that are related to the media asset. The input/output circuitry of the server computer may receive selections of the option to generate the one or more text comments from a plurality of user devices.

At step 1006, control circuitry of the server computer selects a text string in the text comments. For example, the control circuitry of the server computer may identify a plurality of text strings in the text comments. The text strings may be identified as full words within the comment and/or combinations of words in the comment. For instance, the media server may be configured to analyze text comments based on n-grams of varying size, thereby encompassing single words and a plurality of words. The media server may additionally employ other text analysis techniques to ensure that only particular groupings of terms are analyzed. For example, the media server may be configured to separate verbs from noun phrases or to ignore specific terms, such as articles.

At step 1008, control circuitry of the server computer determines whether the text string should be interactive. For example, the control circuitry of the server computer may determine whether the text string should be interactive using any of the methods described herein. The determination may be based on a comparison of scores between other text strings. Thus, step 1008 may be performed after a plurality of text strings in the comments have been identified and pre-analyzed to generate the score. The determination may additionally include a determination that the text string is different from metadata of the media asset, such as based on a comparison between the text string and metadata elements of the media asset. The text string may be determined to be different from the metadata of the media asset if a search through the metadata of the media asset does result in identification of the text string in the metadata of the media asset. If control circuitry of the server computer determines that the text string should not be interactive, the process proceeds to step 1012, which is described further herein.

If at step 1008, control circuitry of the server computer determines that the text string should be interactive, at step 1010, control circuitry of the server computer modifies the text string to contain an interactive element. For example, control circuitry of the server computer may add a hyperlink into the text comment and/or other interactable elements such that the media server receives an indication when an interaction is received with the portion of the text comment containing the text string and can perform one or more actions described previously herein in response.

At step 1012, control circuitry of the server computer determines if there are more text strings to analyze. If control circuitry of the server computer determines there are more text strings to analyze, the process returns to step 1006 and a new text string is selected. If control circuitry of the server computer determines there are not anymore text strings to analyze, the process ends.

Figure 11:
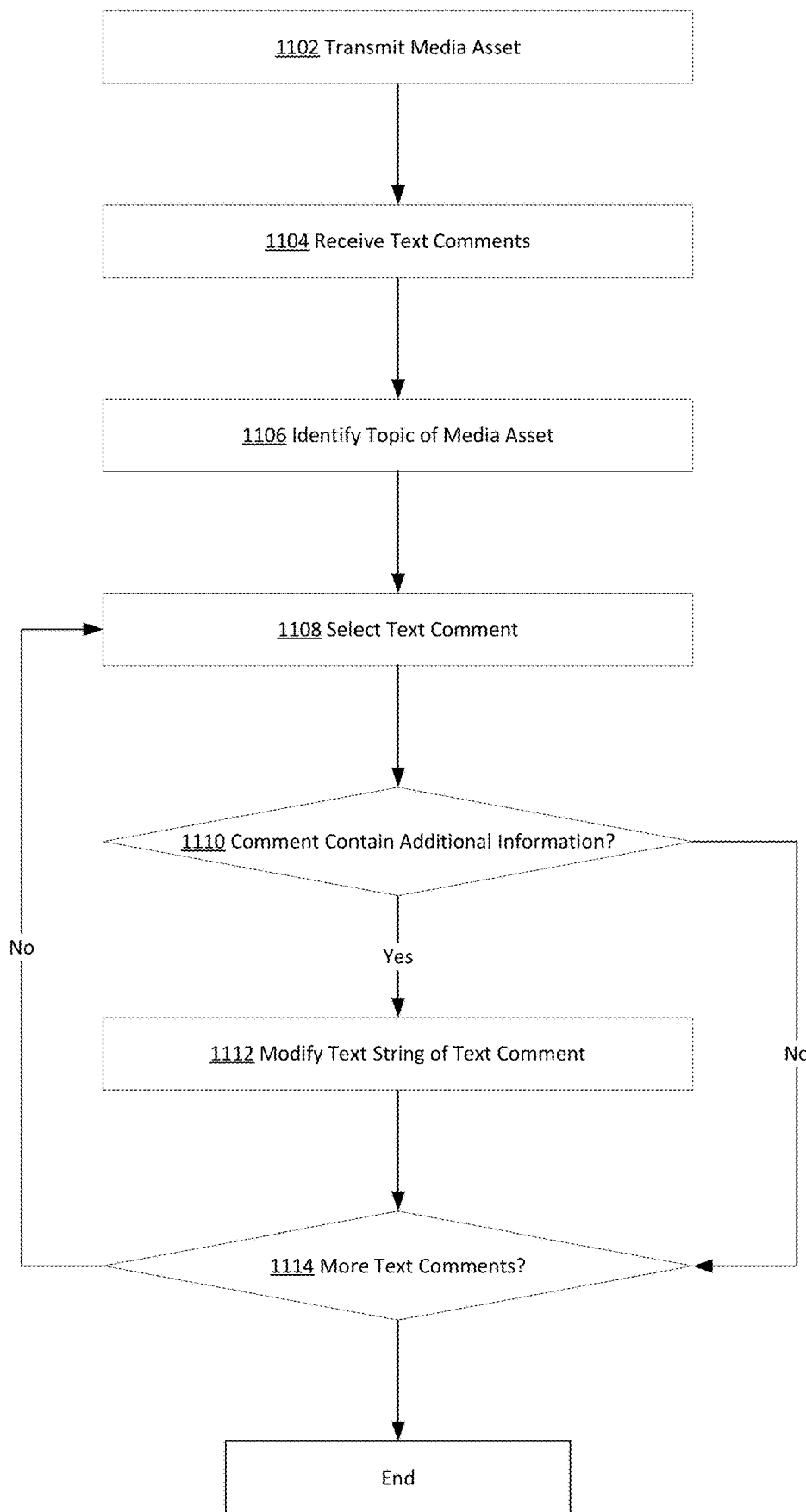
FIG. 11 depicts an example method for generating interactable text strings in comments based on a determination that a comment contains additional information.

FIG. 11 depicts an example method for generating interactable text strings in comments based on a determination that a comment contains additional information.

At step 1102, input/output circuitry of a server computer transmits a media asset to one or more devices. For example, the input/output circuitry of the server computer may provide a graphical user interface to one or more devices through which a media asset, such as a video, image, audio recording, or text, can be displayed.

At step 1104, input/output circuitry of the server computer receives text comments from the one or more devices. For example, the input/output circuitry may provide, within the graphical user interface, an option to generate one or more text comments that are related to the media asset. The input/output circuitry of the server computer may receive selections of the option to generate the one or more text comments from a plurality of user devices.

At step 1106, control circuitry of the server computer identifies a topic of the media asset. For example, control circuitry may determine a topic from a media asset title, media asset tags, or other metadata of the media asset.

At step 1108, control circuitry of the server computer selects a text comment. For example, the control circuitry may select one of the plurality of text comments generated for the media asset to analyze.

At step 1110, control circuitry of the server computer determines whether the comment contains additional information relating to the topic of the media asset. For example, the control circuitry of the server computer may analyze metadata of a device from which the text comment was received to determine whether the comment contains additional information relating to the topic of the media asset, such as based on previous comments left by a profile corresponding to the device, locations visited by the device, or other media assets viewed by the device. In other embodiments, determining that the comment contains additional information comprises determining that the text comment received more than a threshold number of reactions or determining that the text comment contains specific terms modifying general terms.

If at step 1110, control circuitry of the server computer determines that the text comment does not contain additional information, the process proceeds to step 1114, which is described further herein. If, at step 1110, control circuitry of the server computer determines that the text comment contains additional information, at step 1116, control circuitry of the server computer modifies a text string of the text comment to contain an interactive element. For example, control circuitry of the server computer may identify a text string in the text comment using the methods described herein and add a hyperlink into the text comment and/or other interactable elements such that the media server receives an indication when an interaction is received with the portion of the text comment containing the text string and can perform one or more actions described previously herein in response.

At step 1114, control circuitry of the server computer determines if there are more text comments to analyze. If control circuitry of the server computer determines there are more text comments to analyze, the process returns to step 1108 and a new text comment is selected. If control circuitry of the server computer determines there are not anymore text comments to analyze, the process ends.

Figure 12:
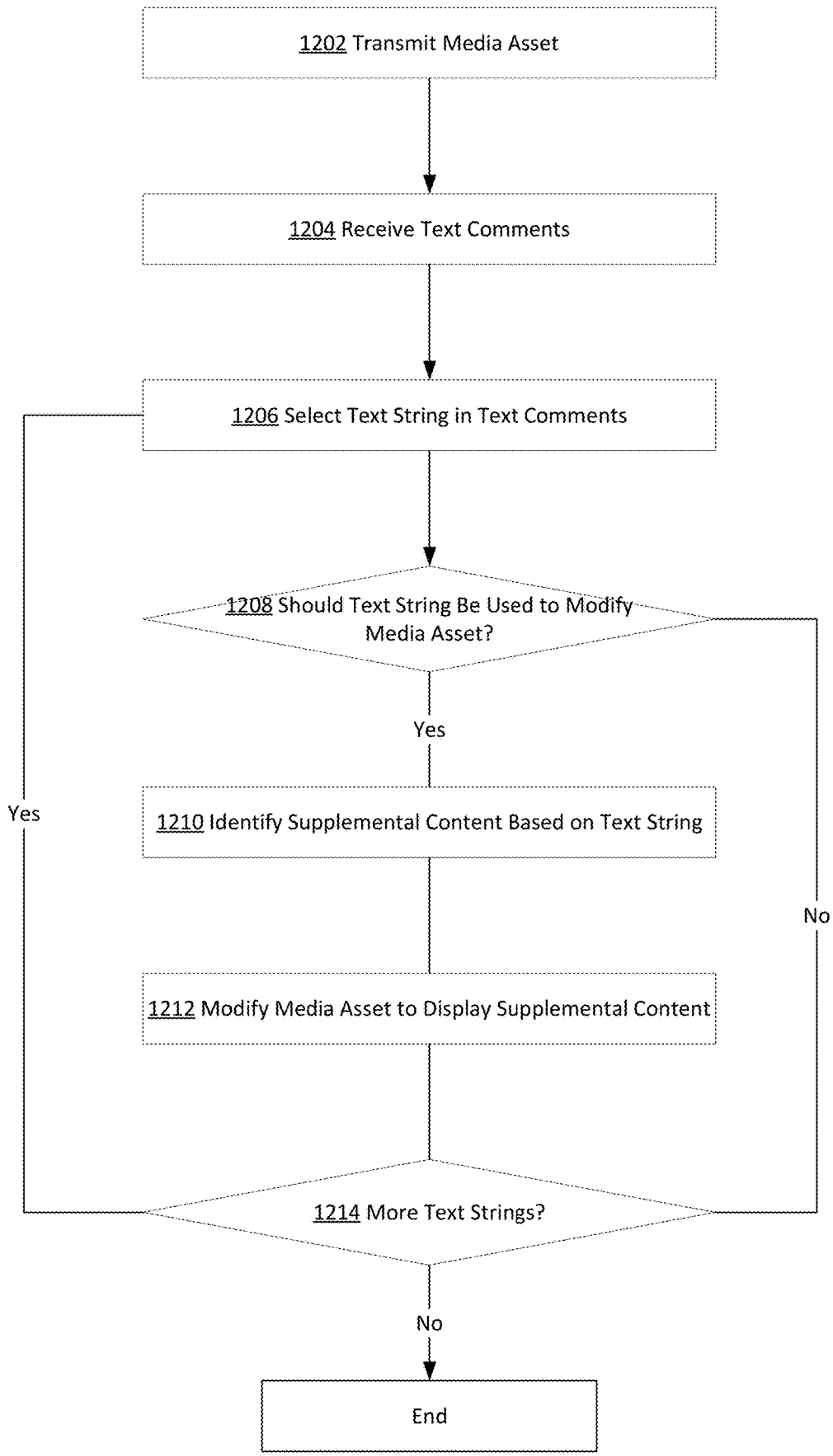
FIG. 12 depicts an example method for dynamically routing notifications based on dynamically identified rules based on the received notification

FIG. 12 depicts an example method for modifying media assets based on text strings in text comments.

At step 1202, input/output circuitry of a server computer transmits a media asset to one or more devices. For example, the input/output circuitry of the server computer may provide a graphical user interface to one or more devices through which a media asset, such as a video, image, audio recording, or text, can be displayed.

At step 1204, input/output circuitry of the server computer receives text comments from the one or more devices. For example, the input/output circuitry may provide, within the graphical user interface, an option to generate one or more text comments that are related to the media asset. The input/output circuitry of the server computer may receive selections of the option to generate the one or more text comments from a plurality of user devices.

At step 1206, control circuitry of the server computer selects a text string in the text comments. For example, the control circuitry of the server computer may identify a plurality of text strings in the text comments. The text strings may be identified as full words within the comment and/or combinations of words in the comment. For instance, the media server may be configured to analyze text comments based on n-grams of varying size, thereby encompassing single words and a plurality of words. The media server may additionally employ other text analysis techniques to ensure that only particular groupings of terms are analyzed. For example, the media server may be configured to separate verbs from noun phrases or to ignore specific terms, such as articles.

At step 1208, control circuitry of the server computer determines whether the text string should be used to modify the media asset. For example, the control circuitry of the server computer may determine whether the text string should be used to modify the media asset using any of the methods described herein. The determination may be based on a comparison of scores between other text strings. Thus, step 1208 may be performed after a plurality of text strings in the comments have been identified and pre-analyzed to generate the score. The determination may additionally include a determination that the text string is different from metadata of the media asset, such as based on a comparison between the text string and metadata elements of the media asset. If control circuitry of the server computer determines that the text string should not be used to modify the media asset, the process proceeds to step 1214, which is described further herein.

If at step 1208, control circuitry of the server computer determines that the text string should be used to modify the media asset, at step 1210, control circuitry of the server computer identifies supplemental content based on the text string. For example, control circuitry of the server computer may identify an overlay for a video that matches the text string and/or identify a video asset, such as an advertisement, that matches the text string.

At step 1212, control circuitry of the server computer modifies the media asset to display the supplemental content. For example, control circuitry of the server computer may insert a video advertisement that matches the text string into the display of the media asset and/or cause display of a media overlay during display of the media asset, such as at a point in time where an image matching the text string is being displayed.

At step 1214, control circuitry of the server computer determines if there are more text strings to analyze. If control circuitry of the server computer determines there are more text strings to analyze, the process returns to step 1206 and a new text string is selected. If control circuitry of the server computer determines there are not anymore text strings to analyze, the process ends.

Example Implementation: Hardware and Software Overview

Figure 13:
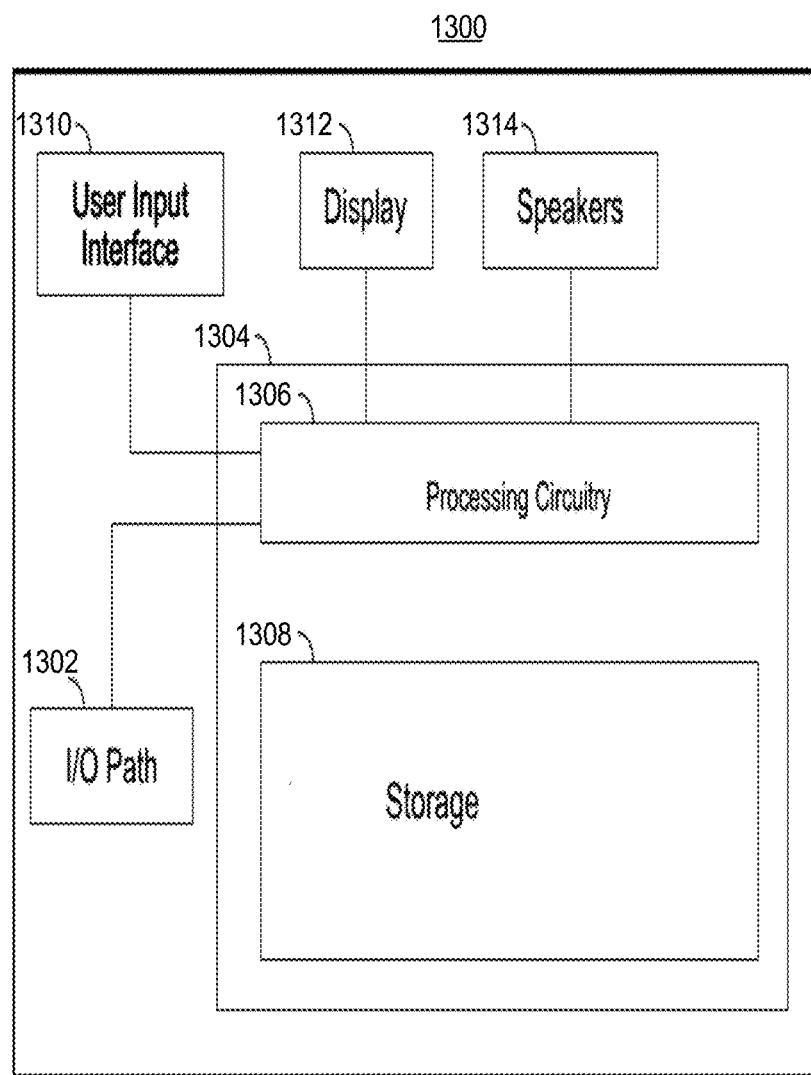
FIG. 13 depicts a generalized embodiment of an illustrative device.

FIG. 13 depicts a generalized embodiment of an illustrative device (e.g., media server 120, user devices 130, viewer device 140). The illustrative device may include a media server that transmits media assets to viewing devices, receives text comments, analyzes the text comments, modifies the text comments to contain interactable elements, and causes display of the text comments with the interactable elements on a client device. The illustrative device may additionally include a user such as a smartphone, a tablet, personal computer, set-top box, etc. (discussed further below with respect to FIG. 14) which displays media assets and text comments. Device 1300 may transmit media and/or text comments through input/output (hereinafter "I/O") path 1302. I/O path 1302 may provide the media assets, text comments, or other data to control circuitry 1304, which includes processing circuitry 1306 and storage 1308. Control circuitry 1304 may be used to send and receive commands, requests, and other suitable data using I/O path 1302. I/O path 1302 may comprise circuitry that connects control circuitry 1304 (and specifically processing circuitry 1006) to one or more communications paths (described below in relation to FIG. 14). I/O functions may be provided by one or more of these communications paths but are shown as a single path in FIG. 13 to avoid overcomplicating the drawing. I/O path 1302 may comprise circuitry for transmitting messages over network 1414 for example, when directed by control circuitry 1304 to transmit said messages. In some embodiments, I/O path 1302 may comprise circuitry that includes wires and/or buses connected to a physical network port, e.g. an ethernet port, a wireless WiFi port, cellular communication port, or any other type of suitable physical port.

Control circuitry 1304 may be based on any suitable processing circuitry such as processing circuitry 1306. Processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., quad-core). In some embodiments, processing circuitry may be distributed across multiple separate processor or processing units, for example, multiple of the same type of processing units (e.g., two Intel Core i7 processors) or multiple different processors (e.g., Ryzen processor with integrated CPU and GPU processing cores) or may include a multi-core processor (e.g., dual-core, quad-core, hexa-core, or any suitable number of cores) or supercomputer. In some embodiments, control circuitry 1004 executes instructions for an application stored in memory (e.g., memory 1308). In some implementations, any action performed by control circuitry 1304 may be based on instructions received from an application executing on device 1300.

The circuitry described herein, including, for example, tuning, audio generating, encoding, decoding, encrypting, decrypting, scaler, and analog/digital circuitry, may be implemented using software running on one or more general purpose or specialized processors. If storage 1308 is provided as a separate device from device 1300, the tuning and encoding circuitry may be associated with storage 1308.

Storage 1308 may be any device for storing electronic data, such as random-access memory, solid state devices, quantum storage devices, hard disk drives, non-volatile memory or any other suitable fixed or removable storage devices, and/or any combination of the same. Control circuitry 1304 may allocate portions of storage 1308 for various purposes such as caching application instructions, recording media assets, storing portions of a media asset, buffering segments of media, etc. As described herein, storage 1308 may be used to store one or more LUTs storing a number of MAC addresses associated with a plurality of user equipment devices and their corresponding profile information.

A user may send instructions to control circuitry 1304 using user input interface 1310. User input interface 1310 may be any suitable user input interface, such as a remote control, mouse, trackball, keypad, keyboard, touchscreen, touchpad, stylus input, joystick, voice recognition interface, or other user input interfaces. Instructions to control circuitry 1304 may be transmitted through I/O path 1302, which could consist of a video tracking and detection mechanism, Internet of Things (IoT) and home automation triggers, emergency alert systems, and software or hardware communication pipelines and/or notification centers.

Display 1312 may be provided as a stand-alone device or integrated with other elements of each one of user equipment device 1300. For example, display 1312 may be a touchscreen or touch-sensitive display, a projector, or a casting device. In such circumstances, user input interface 1310 may be integrated with or combined with display 1312. Display 1312 may be one or more of a monitor, a television, a liquid-crystal display (LCD) for a mobile device, silicon display, e-ink display, light-emitting diode (LED) display, or any other suitable equipment for displaying visual images. Graphics processing circuitry may generate the output to the display 1312. In some embodiments, the graphics processing circuitry may be external to processing circuitry 1306 (e.g., as a graphics processing card that communicates with processing circuitry 1306 via I/O path 1302) or may be internal to processing circuitry 1306 or control circuitry 1304 (e.g., on a same silicone die as control circuitry 1304 or processing circuitry 1306). In some embodiments, the graphics processing circuitry may be used to receive, display, and play content.

Speakers 1314 may be provided as integrated with other elements of user equipment device 1300 or may be stand-alone units. The audio component of videos and other content displayed on display 1312 may be played through speakers 1314. In some embodiments, the audio may be distributed to a receiver (not shown), which processes and outputs the audio via speakers 1314. The speakers 1314 may be part of, but not limited to, a home automation system.

Streaming applications may be, for example, stand-alone applications implemented on user devices. For example, the streaming application may be implemented as software or a set of executable instructions, which may be stored in non-transitory storage 1308 and executed by control circuitry 1304 of a user device 1402, 1404, 1406. In such an approach, instructions of the streaming application are stored locally (e.g., in storage 1308), and data for use by the application is downloaded on a periodic basis (e.g., from an out-of-band feed, from an Internet resource, or using another suitable approach). Control circuitry 1304 may retrieve instructions of the streaming application from storage 1308 and process the instructions to generate any of the displays discussed herein. Based on the processed instructions, control circuitry 1304 may determine what action to perform when user input is received from input interface 1310.

Figure 14:
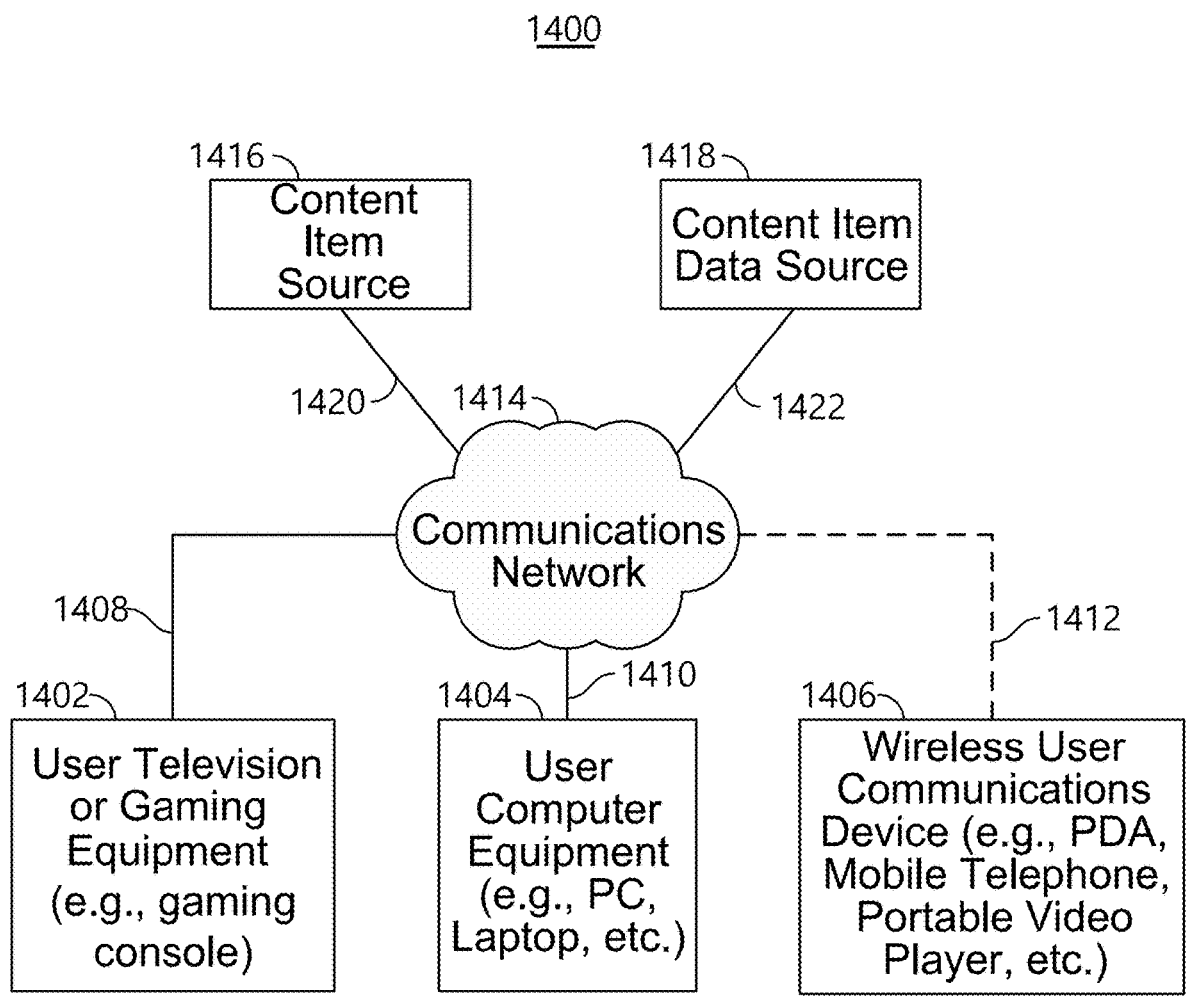
FIG. 14 depicts a block diagram of an illustrative media system, in accordance with some embodiments of the disclosure.

FIG. 14 depicts an example media system in accordance with some embodiments of the disclosure, in which device 1300 can be implemented in the media system 1400 of FIG. 14 as user television equipment 1402, user computer equipment 1404, wireless user communications device 1406, or any other type of user equipment suitable for accessing media. For simplicity, these devices may be referred to herein collectively as user equipment or a user device. User equipment, on which the media application or the streaming application is implemented, may function as a stand-alone device or may be part of a network of devices. Various network configurations of devices may be implemented and are discussed in more detail below.

User television equipment 1402 may include a set-top box, an integrated receiver decoder (IRD) for handling satellite television, a television set, a digital storage device, or other user television equipment. One or more of these devices may be integrated to be a single device, if desired. User computer equipment 1404 may include a PC, a laptop, a streaming content aggregator, a PC media center, or other user computer equipment. It may include devices like digital assistance, smart speakers, and/or home automation. Wireless user communications device 1406 may include a smartphone, a portable video player, a portable music player, a portable gaming machine, a tablet, a wireless streaming device or other wireless device. It should be noted that the lines are blurred when trying to classify a device as one of the above devices and one device may be categorized into one or more of the categories listed above.

In system 1400, there are typically more than one of each type of user equipment, but only one of each is shown in FIG. 14 to avoid overcomplicating the drawing. In addition, each user may utilize more than one type of user equipment (e.g., a user may have a computer and a tablet) and also more than one of each type of user equipment device (e.g., a user may have multiple television sets).

The user equipment may be coupled to communications network 1414. Namely, user television equipment 1402, user computer equipment 1404, and wireless user communications device 1406 are coupled to communications network 1414 via communications paths 1408, 1410, and 1412, respectively. Communications network 1414 is used by the user equipment to obtain the video stream. Communications network 1414 may be one or more networks including the Internet, a mobile phone network, ad-hoc network, or other types of communications network or combination of communications networks. Paths 1408, 1410, and 1412 may separately or together include one or more communications paths, including any suitable wireless communications path. Path 1412 is drawn as a dotted line to indicate it is a wireless path. Communications with the user equipment may be provided by one or more of these communications paths but are shown as a single path in FIG. 14 to avoid overcomplicating the drawing. The user equipment devices may communicate with each other directly through an indirect path via communications network 1414.

System 1400 includes content item source 1416 and content item data source 1418 coupled to communications network 1414 via communications paths 1420 and 1422, respectively. Paths 1420 and 1422 may include any of the communications paths described above in connection with paths 1408, 1410, and 1412. Communications with the content item source 1416 and content item data source 1418 may be exchanged over one or more communications paths but are shown as a single path in FIG. 14 to avoid overcomplicating the drawing. In addition, there may be more than one of each of content item source 1416 and content item data source 1418, but only one of each is shown in FIG. 14 to avoid overcomplicating the drawing. In some embodiments, content item source 1416 and content item data source 1418 are integrated as one source device. Although communications between sources 1416 and 1418 with user equipment are shown as through communications network 1414, in some embodiments, sources 1416 and 1418 may communicate directly with user equipment devices 1402, 1404, and 1406 via communications paths (not shown) such as those described above in connection with paths 1408, 1410, and 1412.

Content item source 1416 or content item data source 1418 may include one or more types of media distribution equipment such as a media server, cable system headend, satellite distribution facility, intermediate distribution facilities and/or servers, Internet providers, on-demand media servers, and other media providers. Content item source 1416 or content item data source 1418 may be the originator of media content or may not be the originator of media content. Content item source 1416 or content item data source 1418 may also include a remote media server used to store different types of media content (including a media asset selected by a user), in a location remote from any of the user equipment. Systems and methods for providing remotely stored media to user equipment are discussed in greater detail in connection with Ellis et al., U.S. Pat. No. 7,761,892, issued Jul. 20, 2010, which is hereby incorporated by reference herein in its entirety.

System 1400 is intended to illustrate a number of approaches, or network configurations, by which user equipment devices and sources of media content and guidance data may communicate with each other for the purpose of accessing media and data related to the media. The configuration of the devices and paths in system 1400 may change without departing from the scope of the present disclosure.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods. For example, the process of FIG. 10 can be performed on any of the devices shown in FIGS. 13-14. Additionally, any of the steps in processes described herein can be performed in any order, can be omitted, and/or can be combined with any of the steps from any other process.

What is claimed is:

1. A method comprising:
storing a first media asset and metadata for the first media asset;
causing to display the first media asset and text comments, wherein the text comments are for the first media asset and received from other devices to which the first media asset was displayed;
determining that a text string in the text comments is different from the metadata for the first media asset;
in response to the determining that the text string in the text comments is different from the metadata for the first media asset:
(a) identifying supplemental content based on the text string;
(b) identifying the supplemental content comprises additional information that is missing from the metadata of the first media asset; and
(c) modifying the display of the first media asset to comprise displaying of the supplemental content.

2. The method of claim 1, further comprising:
identifying user input interacting with a particular comment that comprises the text string; and
performing the identifying supplemental content based on the text string at least partially in response to identifying the user input interacting with the particular comment.

3. The method of claim 2, wherein the input interacting with the particular comment comprises one or more of inputting a reply to the particular comment or selecting an interface element corresponding to a reaction to the particular comment.

4. The method of claim 2, wherein the input interacting with the particular comment comprises hovering a cursor within a threshold distance of the particular comment for greater than a threshold period of time.

5. The method of claim 2, wherein the input interacting with the particular comment comprises displaying the particular comment for greater than a threshold period of time.

6. The method of claim 2, wherein the input interacting with the particular comment comprises a command to copy a portion of the particular comment.

7. The method of claim 1, further comprising:
determining that the text string corresponds to an item; and
analyzing the first media asset to identify the item at a timestamp in the first media asset, wherein the modifying the display of the first media asset to comprise displaying of the supplemental content further comprises causing display of the supplemental content at the timestamp.

8. The method of claim 7, further comprising:
determining a location of the item in the first media asset; and
detecting user input interacting with the display of the first media asset at the location and timestamp and, in response, performing the modifying the display of the first media asset to comprise displaying the supplemental content.

9. The method of claim 1, wherein the supplemental content is an interactable element, and wherein the modifying the display of the first media asset to comprise displaying the interactable element further comprises causing a portion of the first media asset to be interactable via the interactable element.

10. The method of claim 9, wherein the interactable element is a recommendation to view a second media asset, and wherein an interaction with the interactable element causes displaying of the second media asset.

11. A system comprising:
a memory configured to store a first media asset and metadata for the first media asset;
input/output circuitry configured to cause to display the first media asset and text comments, wherein the text comments are for the first media asset and received from other devices to which the first media asset was displayed; and
control circuitry configured to:
determine that a text string in the text comments is different from the metadata for the first media asset;
in response to the determining that the text string in the text comments is different from the metadata for the first media asset:
(a) identify supplemental content based on the text string;
(b) identify the supplemental content comprises additional information that is missing from the metadata of the first media asset; and
(c) modify the display of the first media asset to comprise displaying of the supplemental content.

12. The system of claim 11, wherein the control circuitry is further configured to:
identifying user input interacting with a particular comment that comprises the text string; and
performing the identifying supplemental content based on the text string at least partially in response to identifying the user input interacting with the particular comment.

13. The system of claim 12, wherein the input interacting with the particular comment comprises one or more of inputting a reply to the particular comment or selecting an interface element corresponding to a reaction to the particular comment.

14. The system of claim 12, wherein the input interacting with the particular comment comprises hovering a cursor within a threshold distance of the particular comment for greater than a threshold period of time.

15. The system of claim 12, wherein the input interacting with the particular comment comprises displaying the particular comment for greater than a threshold period of time.

16. The system of claim 12, wherein the input interacting with the particular comment comprises a command to copy a portion of the particular comment.

17. The system of claim 11, wherein the control circuitry is further configured to:
determine that the text string corresponds to an item; and
analyze the first media asset to identify the item at a timestamp in the first media asset,
wherein when modifying the display of the first media asset to comprise displaying of the supplemental content the control circuitry is further configured to cause display of the supplemental content at the timestamp.

18. The system of claim 17, wherein the control circuitry is further configured to:
determine a location of the item in the first media asset; and
detect user input interacting with the display of the first media asset at the location and timestamp and, in response, perform the modifying the display of the first media asset to comprise displaying the supplemental content.

19. The system of claim 11, wherein the supplemental content is an interactable element and wherein when modifying the display of the first media asset to comprise displaying the interactable element the control circuitry is further configured to cause a portion of the first media asset to be interactable via the interactable element.

20. The method of claim 9, wherein the interactable element is a recommendation to view a second media asset and wherein an interaction with the interactable element causes displaying of the second media asset.

* * * * *